(12) United States Patent
Nhep

(10) Patent No.: US 9,151,904 B2
(45) Date of Patent: Oct. 6, 2015

(54) FIBER OPTIC CONNECTOR

(71) Applicant: ADC Telecommunications, Inc., Berwyn, PA (US)

(72) Inventor: Ponharith Nhep, Savage, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 14/154,352

(22) Filed: Jan. 14, 2014

(65) Prior Publication Data

US 2014/0254988 A1 Sep. 11, 2014

Related U.S. Application Data

(63) Continuation of application No. 13/420,286, filed on Mar. 14, 2012, now Pat. No. 8,636,425.

(60) Provisional application No. 61/510,711, filed on Jul. 22, 2011, provisional application No. 61/452,953, filed on Mar. 15, 2011.

(51) Int. Cl.
*G02B 6/36* (2006.01)
*G02B 6/38* (2006.01)

(52) U.S. Cl.
CPC .............. *G02B 6/381* (2013.01); *G02B 6/3887* (2013.01)

(58) Field of Classification Search
CPC .. G02B 6/3869; G02B 6/3821; G02B 6/3885; G02B 6/3887; G02B 6/3893; G02B 6/3855; G02B 6/3857; G02B 6/3858
USPC ...................................................... 385/78, 81
See application file for complete search history.

(56) References Cited

U.S. PATENT DOCUMENTS

| 3,395,244 A | 7/1968 | Koehler |
| 4,050,783 A | 9/1977 | Tardy |
| 4,190,316 A | 2/1980 | Malsby et al. |

(Continued)

FOREIGN PATENT DOCUMENTS

| CN | 1737628 | 2/2006 |
| EP | 0 479 415 A2 | 4/1992 |

(Continued)

OTHER PUBLICATIONS

International Search Report and Written Opinion mailed Sep. 25, 2012 for International Application No. PCT/US2012/029241.

(Continued)

*Primary Examiner* — Jerry Blevins
(74) *Attorney, Agent, or Firm* — Merchant & Gould P.C.

(57) ABSTRACT

A connector includes a ferrule assembly having a ferrule, a hub and a spring, the ferrule having a distal face accessible at a distal end of the connector housing, the ferrule being movable in a proximal direction relative to the connector housing. The distal and proximal positions are separated by an axial displacement distance. The ferrule proximal movement is against the spring's bias. The cable of the assembly includes an optical fiber contained within a jacket and also a strength layer between the fiber and the jacket that is anchored to the connector housing. The fiber extends through a fiber from the proximal end of the connector housing to the ferrule. The fiber has a distal portion potted within the ferrule. The fiber passage has a fiber take-up region configured to take-up an excess length of the fiber corresponding to the ferrule axial displacement.

21 Claims, 46 Drawing Sheets

(56) References Cited

U.S. PATENT DOCUMENTS

| | | |
|---|---|---|
| 4,225,214 A | 9/1980 | Hodge et al. |
| 4,291,941 A | 9/1981 | Melzer |
| 4,309,071 A | 1/1982 | Prunier |
| 4,320,938 A | 3/1982 | Gunnersen et al. |
| 4,373,777 A | 2/1983 | Borsuk et al. |
| 4,588,256 A | 5/1986 | Onstott et al. |
| 4,669,820 A | 6/1987 | Ten Berge |
| 4,746,194 A | 5/1988 | Rasmussen |
| 4,787,699 A | 11/1988 | Moulin |
| 4,807,958 A | 2/1989 | Gunner et al. |
| 4,850,671 A | 7/1989 | Finzel |
| 4,984,865 A | 1/1991 | Lee et al. |
| RE34,005 E | 7/1992 | Levinson et al. |
| 5,151,961 A | 9/1992 | Hvezda et al. |
| 5,261,019 A | 11/1993 | Beard et al. |
| 5,317,633 A | 5/1994 | Hiraiwa |
| 5,321,784 A | 6/1994 | Cubukciyan et al. |
| 5,390,272 A | 2/1995 | Repta et al. |
| 5,418,876 A | 5/1995 | Lee |
| 5,446,819 A | 8/1995 | Foster et al. |
| 5,469,521 A | 11/1995 | Coutts et al. |
| 5,611,017 A | 3/1997 | Lee et al. |
| 5,631,986 A | 5/1997 | Frey et al. |
| 5,647,043 A | 7/1997 | Anderson et al. |
| 5,802,230 A | 9/1998 | Kuribayashi et al. |
| 5,806,175 A | 9/1998 | Underwood |
| 5,862,282 A | 1/1999 | Matsuura et al. |
| 5,883,988 A | 3/1999 | Yamamoto et al. |
| 5,883,995 A | 3/1999 | Lu |
| 5,915,056 A | 6/1999 | Bradley et al. |
| 5,960,141 A | 9/1999 | Sasaki et al. |
| 6,054,007 A | 4/2000 | Boyd et al. |
| 6,079,880 A | 6/2000 | Blom |
| 6,142,676 A | 11/2000 | Lu |
| 6,179,658 B1 | 1/2001 | Gunay et al. |
| 6,325,670 B2 | 12/2001 | Murayama |
| 6,341,898 B1 | 1/2002 | Matsushita |
| 6,419,402 B1 | 7/2002 | Zimmel |
| 6,432,511 B1 | 8/2002 | Davis et al. |
| 6,456,768 B1 | 9/2002 | Boncek et al. |
| 6,513,989 B1 | 2/2003 | Bleck et al. |
| 6,543,941 B1 | 4/2003 | Lampert |
| 6,782,182 B2 | 8/2004 | Dautartas et al. |
| 6,811,321 B1 | 11/2004 | Schmalzigaug et al. |
| 6,811,323 B2 | 11/2004 | Murray et al. |
| 6,819,858 B2 | 11/2004 | Steinberg et al. |
| 6,848,837 B2 | 2/2005 | Gilligan |
| 6,893,591 B2 | 5/2005 | Davis et al. |
| 6,945,706 B2 | 9/2005 | Gimbel et al. |
| 7,147,384 B2 | 12/2006 | Hardcastle et al. |
| 7,147,385 B2 | 12/2006 | Zimmel et al. |
| 7,467,896 B2 | 12/2008 | Melton et al. |
| 7,490,994 B2 | 2/2009 | Scadden et al. |
| 7,534,050 B2 | 5/2009 | Kachmar |
| 7,578,623 B2 | 8/2009 | Wang et al. |
| 7,677,812 B2 | 3/2010 | Castagna et al. |
| 7,758,256 B2 | 7/2010 | Hopkins et al. |
| 7,766,556 B2 | 8/2010 | Kachmar |
| 7,802,926 B2 | 9/2010 | Leeman et al. |
| 7,918,609 B2 | 4/2011 | Melton et al. |
| 2001/0010741 A1 | 8/2001 | Hizuka |
| 2001/0033730 A1 | 10/2001 | Fentress |
| 2002/0067894 A1 | 6/2002 | Scanzillo |
| 2002/0154868 A1 | 10/2002 | Kraus et al. |
| 2003/0031447 A1* | 2/2003 | Nault ............................ 385/131 |
| 2003/0063868 A1 | 4/2003 | Fentress |
| 2004/0057672 A1 | 3/2004 | Doss et al. |
| 2005/0135755 A1 | 6/2005 | Kiani et al. |
| 2005/0213899 A1 | 9/2005 | Hurley et al. |
| 2005/0276559 A1 | 12/2005 | Bianchi |
| 2005/0281509 A1 | 12/2005 | Cox et al. |
| 2006/0002662 A1 | 1/2006 | Manning et al. |
| 2007/0292084 A1 | 12/2007 | Gurreri et al. |
| 2008/0013891 A1 | 1/2008 | Nishioka et al. |
| 2008/0240658 A1 | 10/2008 | Leeman et al. |
| 2009/0041411 A1 | 2/2009 | Melton et al. |
| 2009/0060423 A1 | 3/2009 | Melton et al. |
| 2009/0297104 A1 | 12/2009 | Kachmar |
| 2009/0310919 A1* | 12/2009 | Arai et al. ....................... 385/87 |
| 2010/0254663 A1 | 10/2010 | Hopkins et al. |
| 2011/0002586 A1 | 1/2011 | Nhep |
| 2012/0288238 A1 | 11/2012 | Park et al. |
| 2012/0328247 A1 | 12/2012 | Kachmar |

FOREIGN PATENT DOCUMENTS

| | | |
|---|---|---|
| EP | 0 689 070 A1 | 12/1995 |
| EP | 0 810 455 A1 | 12/1997 |
| EP | 0 916 974 A2 | 5/1999 |
| GB | 2 062 283 A | 5/1981 |
| JP | 59-177513 | 10/1984 |
| JP | 61-284710 | 12/1986 |
| JP | 4-40402 | 2/1992 |
| JP | 2002-82257 A | 3/2002 |
| JP | 2009-192908 | 8/2009 |
| WO | WO 97/23797 | 7/1997 |
| WO | WO 01/42836 A2 | 6/2001 |
| WO | WO 2010/039837 A1 | 4/2010 |
| WO | WO 2010/118031 | 10/2010 |
| WO | WO 2012/005407 A1 | 1/2012 |

OTHER PUBLICATIONS

European Search Report for Application No. 12757527.2 mailed Sep. 5, 2014.

* cited by examiner

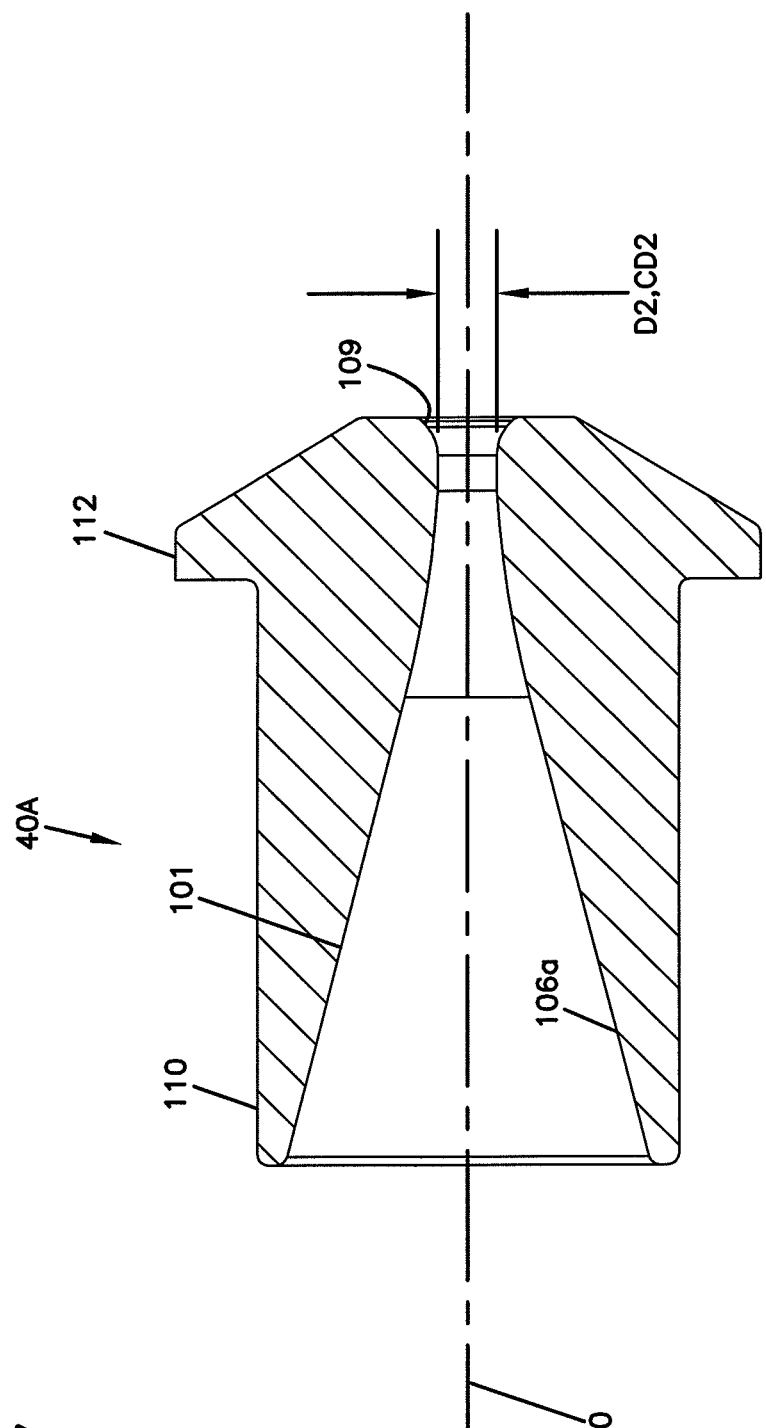

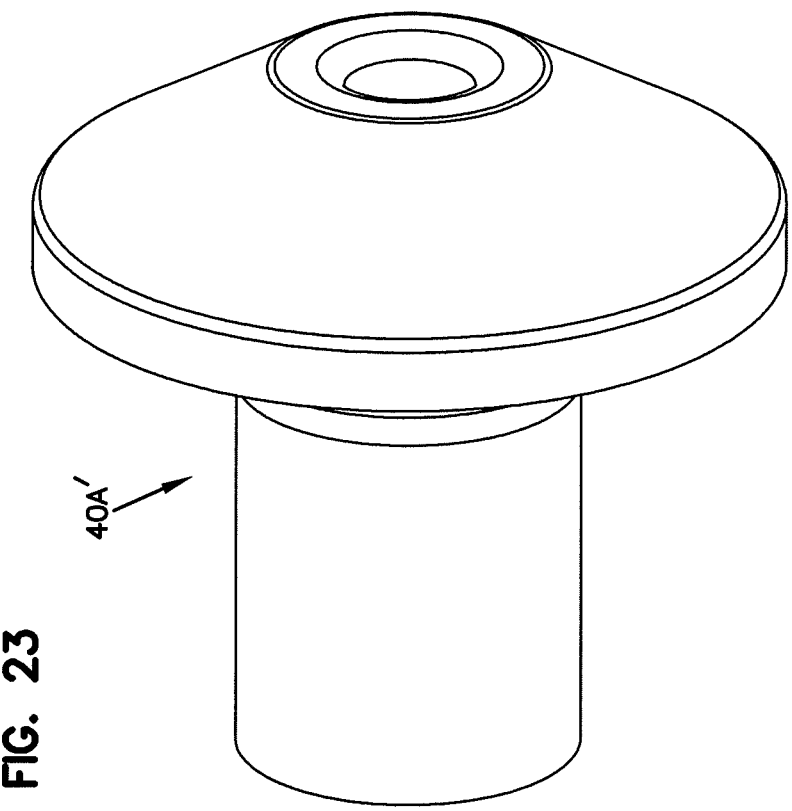
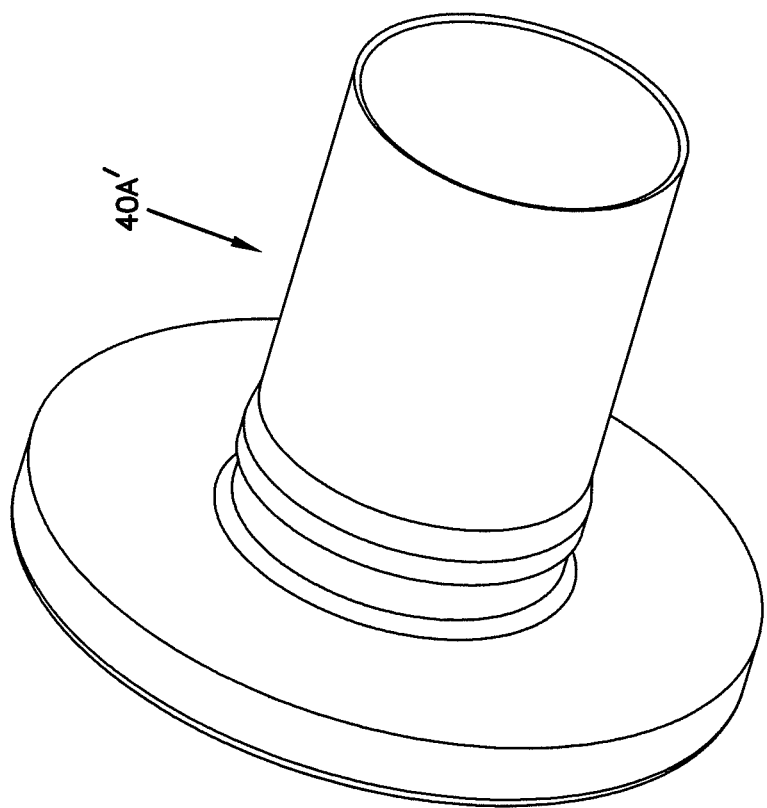

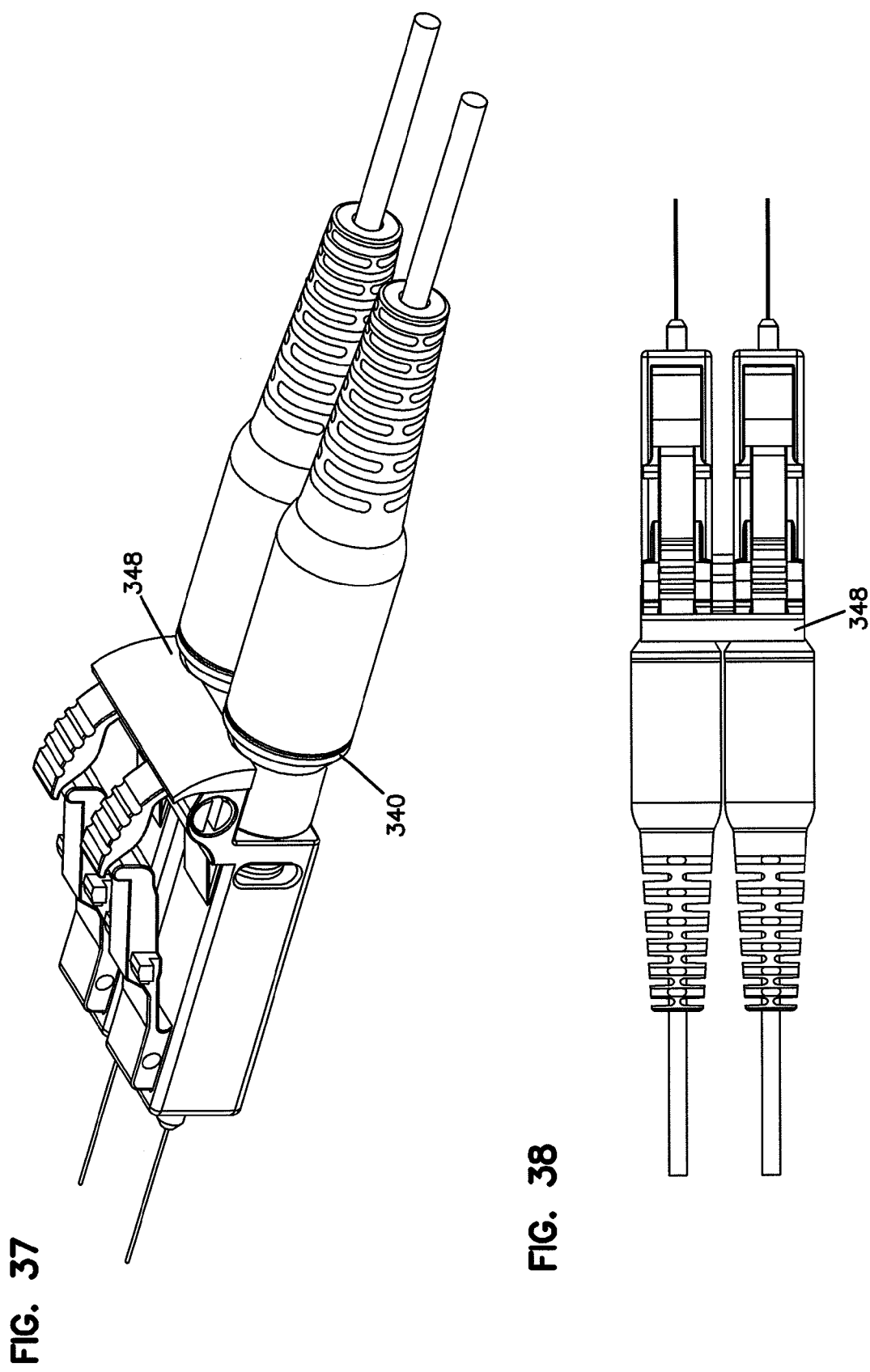

FIBER OPTIC CONNECTOR

CROSS REFERENCE TO RELATED APPLICATIONS

This application is a continuation of U.S. patent application Ser. No. 13/420,286, filed Mar. 14, 2012, now U.S. Pat. No. 8,636,425, which claims the benefit of U.S. Provisional Patent Application Ser. Nos. 61/510,711, filed Jul. 22, 2011, and 61/452,953, filed Mar. 15, 2011, which applications are hereby incorporated by reference in their entireties.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

A fiber optic connector is often secured to the end of a corresponding fiber optic cable by anchoring strength numbers of the cable to the connector housing of the connector. Anchoring is typically accomplished through the use of conventional techniques such as crimps or adhesive. Anchoring the strength numbers of the cable to the connector housing is advantageous because it allows tensile load applied to the cable to be transferred from the strength members of the cable directly to the connector housing. In this way, the tensile load is not transferred to the ferrule assembly of the fiber optic connector. If the tensile load were to be applied to the ferrule assembly, such tensile load could cause the ferrule assembly to be pulled in a proximal direction against the bias of the connector spring thereby possibly causing an optical disconnection between the connector and its corresponding mated connector. Fiber optic connectors of the type described above can be referred to as pull-proof connectors.

As indicated above, when two fiber optic connectors are interconnected together, the ferrules of the two connectors contact one another and are respectively forced in proximal directions relative to their housings against the bias of their respective connector springs. In the case of pull-proof connectors, such proximal movement of the ferrules causes the optical fibers secured to the ferrules to move proximally relative to the connector housings and relative to the jackets of the fiber optic cables secured to the connectors. To accommodate this relative proximal movement of the optical fibers, the fiber optic cables typically have sufficient interior space to allow the optical fibers to bend in a manner that does not compromise signal quality in a meaningful way. Typically, the bending comprises "macrobending" in which the bends have radii of curvatures that are larger than the minimum bend radius requirements of the optical fiber.

A number of factors are important with respect to the design of a fiber optic connector. One aspect relates to ease of manufacturing and assembly. Another aspect relates to connector size and the ability to provide enhanced connector/circuit densities. Still another aspect relates to the ability to provide high signal quality connections with minimal signal degradation.

SUMMARY

One aspect of the present disclosure relates to a fiber optic connector having features that facilitate connector assembly. For example, such features can include structures for enhancing guiding optical fibers into a connector during assembly, and for facilitating applying epoxy into a ferrule of a connector during assembly.

Another aspect of the present disclosure relates to fiber optic connectors having features that prevent unacceptable bending of an optical fiber when ferrules of the connectors are moved proximally relative to the connector housings as two connectors are coupled together. In certain embodiments, the connectors can include space for accommodating macrobending of the optical fibers within the connector housings.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a cross-sectional view that longitudinally bisects the insertion cap of FIGS. 5 and 6.

FIG. 22 is a perspective view showing a first end of a second insertion cap that can be used with the fiber optic connection of FIG. 14;

FIG. 23 is a perspective view showing a second end of the insertion cap of FIG. 22;

FIG. 37 illustrates a perspective view of two of the fiber optic connectors of FIG. 29 coupled together by a clip to form a duplex fiber optic connector;

FIG. 38 is a top view of the duplex fiber optic connector of FIG. 37;

DETAILED DESCRIPTION

Figure 1:
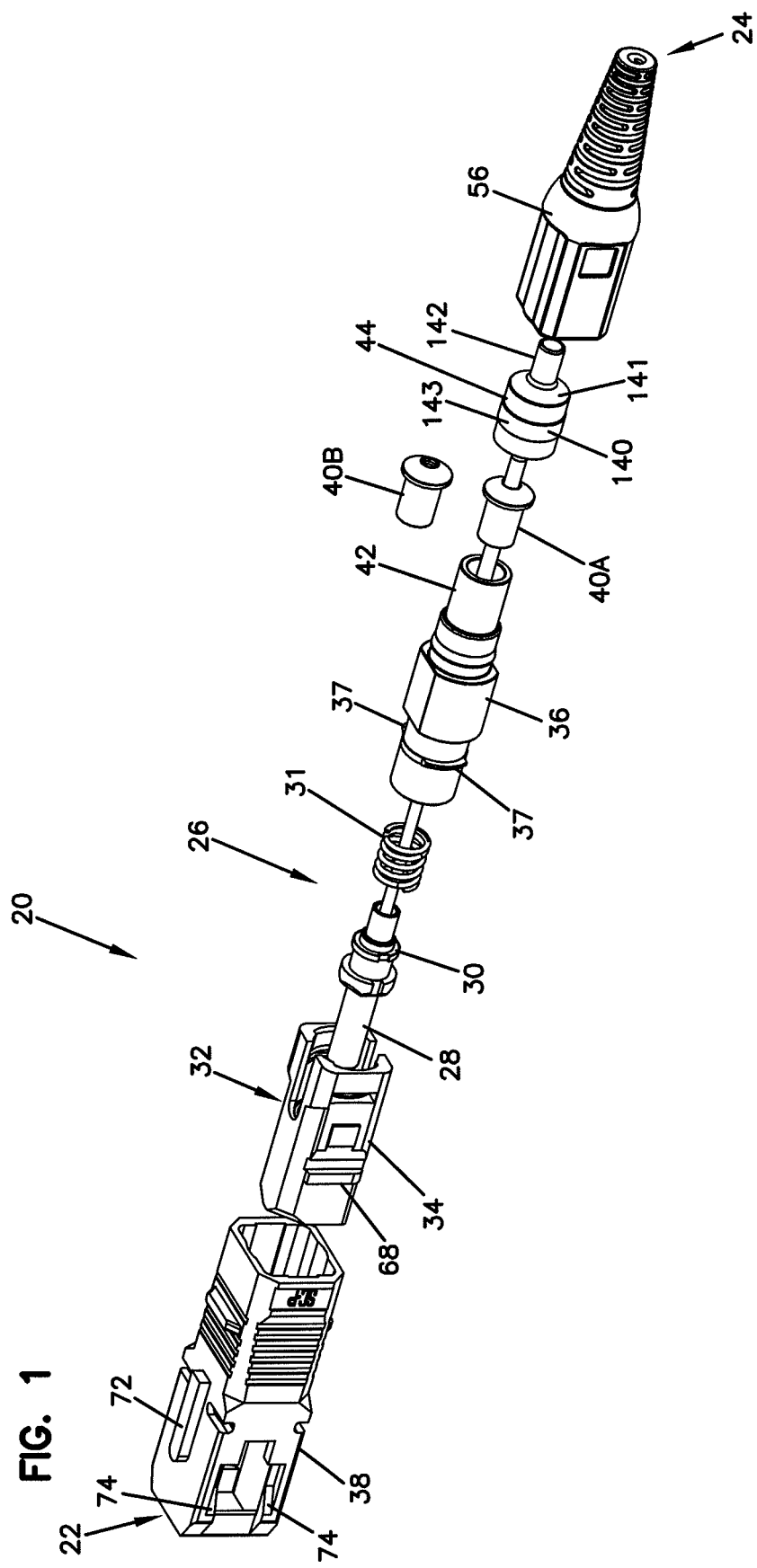
FIG. 1 is a perspective, exploded view of a fiber optic connector in accordance with the principles of the present disclosure.
Figure 2:
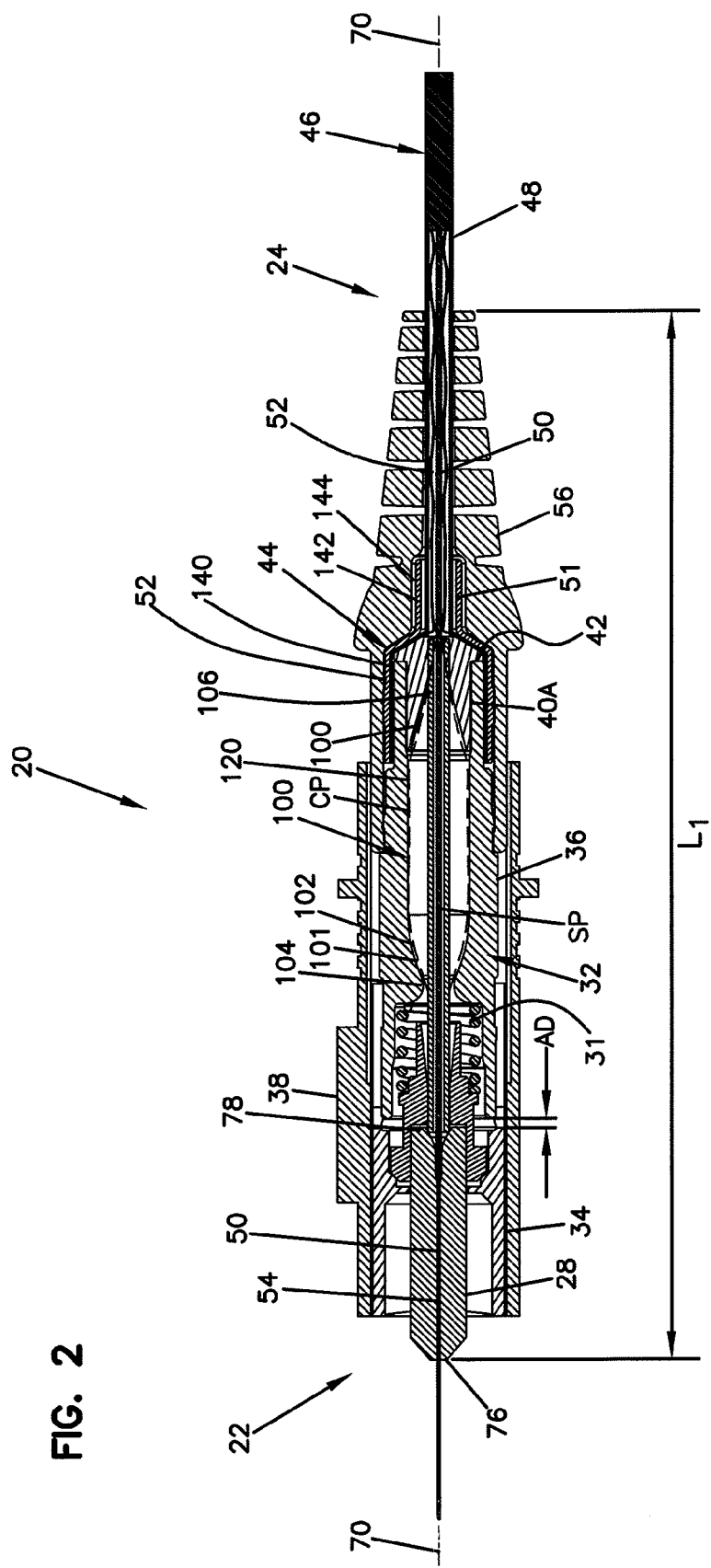
FIG. 2 is a cross-sectional view that longitudinally bisects the fiber optic connector of FIG. 1.
Figure 3:
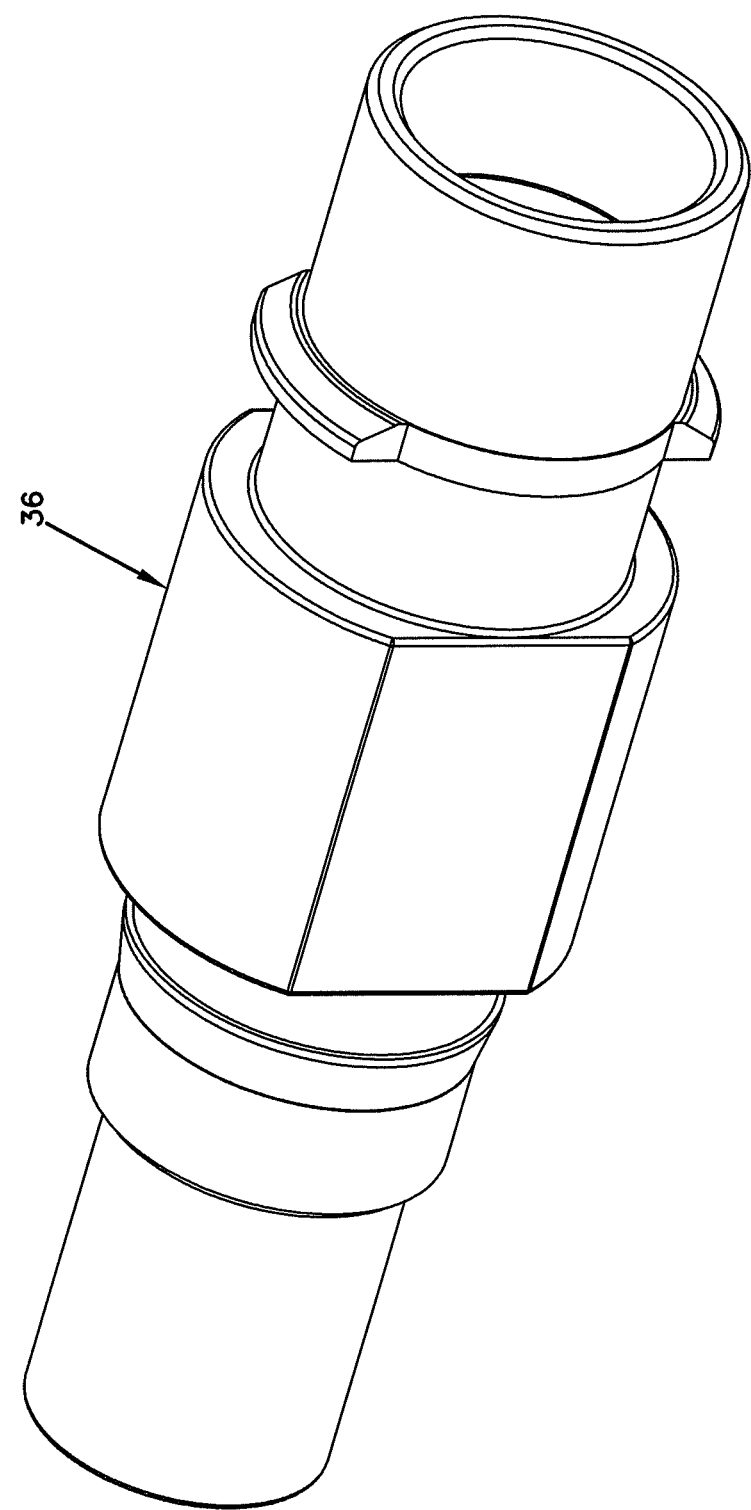
FIG. 3 is a perspective view of a rear housing of the fiber optic connector of FIG. 1.

FIGS. 1 and 2 illustrate a first fiber optic connector 20 in accordance with the principles of the present disclosure. The fiber optic connector 20 has a total length $L_1$ that extends from a distal end 22 of the fiber optic connector 20 to a proximal end 24 of the fiber optic connector 20. The fiber optic connector 20 includes a ferrule assembly 26 that mounts adjacent the distal end 22 of the fiber optic connector 20. The ferrule assembly includes a ferrule 28, a hub 30 and a spring 31. The ferrule assembly 26 mounts at least partially within a connector housing 32 including a distal housing portion 34 that interconnects with a proximal housing portion 36. In one embodiment, the distal housing portion 34 snaps over ribs 37 provided on the proximal housing portion 36 to interlock the two housing portions together. The fiber optic connector 20 also includes a release sleeve 38 that slidably mounts over the connector housing 32. The fiber optic connector 20 further includes an insertion cap 40A that mounts inside a proximal end 42 of the proximal housing portion 36 and a crimp sleeve 44 that mounts around the exterior of the proximal end 42 of the proximal housing portion 36. The proximal end 24 of the fiber optic connector 20 is configured to receive, anchor and provide strain relief/bend radius protection to a fiber optic cable 46. The fiber optic cable 46 includes a jacket 48 surrounding at least one optical fiber 50. The fiber optic cable 46 also includes a strength layer 52 formed by a plurality of strength members (e.g., reinforcing fibers such as aramid yarn/Kevlar) positioned between the optical fiber 50 and the jacket 48. A distal end portion of the strength layer 52 is crimped between the crimp sleeve 44 and the exterior surface of the proximal end 42 of the proximal housing portion 36 so as to anchor the strength layer 52 to the connector housing 32. The optical fiber 50 is routed through the total length $L_1$ of the fiber optic connector 20 and includes a distal portion 54 secured within the ferrule 28. The fiber optic connector 20 further includes a strain relief boot 56 mounted at the proximal end 24 of the fiber optic connector 20 for providing strain relief and bend radius protection to the optical fiber 50.

Figure 25:
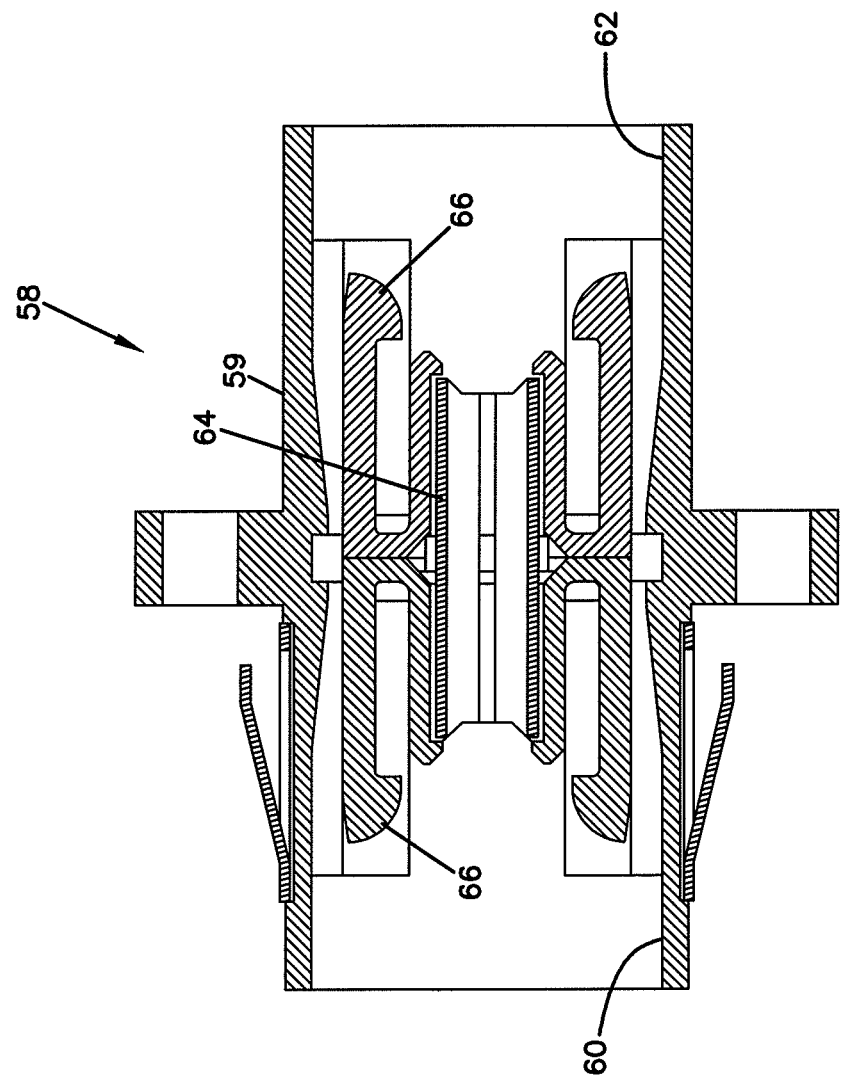
FIG. 25 is a cross-sectional view that longitudinally bisects a prior art fiber optic adapter.

It will be appreciated that the fiber optic connector 20 is adapted to be mechanically coupled to a like fiber optic connector by an intermediate fiber optic adapter. FIG. 25 shows an example fiber optic adapter 58 that can be used to couple two of the fiber optic connectors 20 together. The fiber optic adapter 58 includes an adapter housing 59 defining opposite, coaxially aligned ports 60, 62 for receiving two of the fiber optic connectors desired to be coupled together. The fiber optic adapter 58 also includes an alignment sleeve 64 for receiving and aligning the ferrules 28 of the fiber optic connectors desired to be connected together. The fiber optic adapter 58 further includes latches 66 for mechanically retaining the fiber optic connectors 20 within their respective ports 60, 62. The latches 66 can be configured to engage shoulders 68 provided on the distal housing portions 34 of the fiber optic connectors 20 being coupled together. Further details regarding the fiber optic adapter 58 can be found in U.S. Pat. No. 5,317,633, which is hereby incorporated by reference in its entirety.

In the depicted embodiment of FIG. 1, the release sleeve 38 is shown as a conventional SC release sleeve. When the release sleeve 38 is mounted on the connector housing 32, the release sleeve 38 is free to slide back-and-forth in distal and proximal directions relative to the connector housing 32 along a central longitudinal axis 70 of the fiber optic connector 20. When the fiber optic connector 20 is inserted within one of the ports 60, 62 of the fiber optic adapter 58, the keying rail 72 provided on the release sleeve 38 ensures that the fiber optic connector 20 is oriented at the appropriate rotational orientation relative to the fiber optic adapter 58. When the fiber optic connector 20 is fully inserted within its corresponding port 60, 62, the latches 66 snap into a latching position in which the latches engage the shoulders 68 of the connector housing 32 to prevent the fiber optic connector 20 from being proximally withdrawn from the port 60, 62. The release sleeve 38 is provided to allow the fiber optic connector 20 to be selectively withdrawn from its respective port 60, 62. Specifically, by pulling the release sleeve 38 in a proximal direction, ramps 74 of the release sleeve disengage the latches 66 of the fiber optic adapter 58 from the shoulders 68 of the fiber optic connector 20 thereby allowing the fiber optic connector 20 to be proximally withdrawn from its respective port 60, 62.

Referring to FIG. 2, the ferrule 28 of the ferrule assembly 26 includes a distal end 76 and a proximal end 78. The distal end 76 projects distally outwardly beyond a distal end of the connector housing 32 and the proximal end 78 is secured within the ferrule hub 30. When the connector housing 32 is assembled as shown at FIG. 2, the ferrule hub 30 and the spring 31 are captured between the distal housing portion 34 and the proximal housing portion 36 of the connector housing 32. As so configured, the spring 31 is configured to bias the ferrule 28 in a distal direction relative to the connector housing 32. When two of the fiber optic connectors 20 are interconnected, their ferrules 28 are forced to move in proximal directions relative to their respective connector housings 34 against the bias of their respective springs 31. The movement is along the central axes 70 of the mated fiber optic connectors 20.

Figure 26:
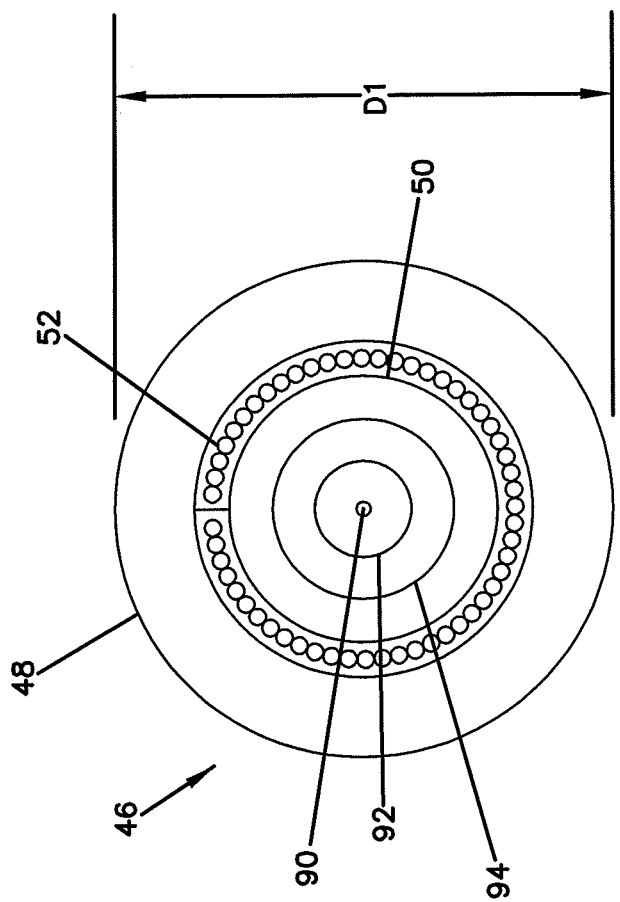
FIG. 26 is a cross-sectional view taken along section line 26-26 of FIG. 2.

Referring to FIGS. 2 and 26, the jacket 48 of the fiber optic cable 46 preferably has a relatively small outer diameter $D_1$. In certain embodiments, the outer diameter $D_1$ can be less than 2 millimeters, or less than 1.5 millimeters, less than equal to about 1.2 millimeters. In certain embodiments, the optical fiber 50 within the jacket 48 can include a core 90, a cladding layer 92 surrounding the core and one or more coating layers 94 surrounding the cladding layer 92. In certain embodiments, the core 90 can have an outer diameter of about 10 microns, the cladding layer 92 can have an outer diameter of about 125 microns, and the one or more coating layers 94 can have an outer diameter in the range of about 240 to 260 microns. The strength layer 52 provides tensile reinforcement to the cable 46. The strength layer 52 relatively closely surrounds the coating layer 94 of the optical fiber 50. In addition to providing tensile strength to the cable 46, the strength layer 52 also functions as a separator for separating the optical fiber 50 from the outer jacket 48. In certain embodiments, no buffer layer or buffer tube is provided between the coating layer 94 of the optical fiber 50 and the strength layer 52. Further details regarding the fiber optic cable 46 can be found in U.S. patent application Ser. No. 12/473,931, which is hereby incorporated by reference in its entirety.

As shown at FIG. 2, the optical fiber 50 extends through the total length $L_1$ of the fiber optic connector 20. For example, the optical fiber 50 extends through the strain relief boot 56, the insertion cap 40A, the connector housing 32 and the ferrule 28. In certain embodiments, a portion of the optical fiber 50 extending proximally from the ferrule 28 through the fiber optic connector 20 to the jacketed portion of the fiber optic cable 46 includes only the core 90, the cladding layer 92 and the one or more coating layers 94. The portion of the optical fiber 50 extending through the ferrule 28 typically only includes the core 90 and the cladding layer 92. A distal most end face of the optical fiber 50 is preferably polished as is conventionally known in the art.

Figure 6:
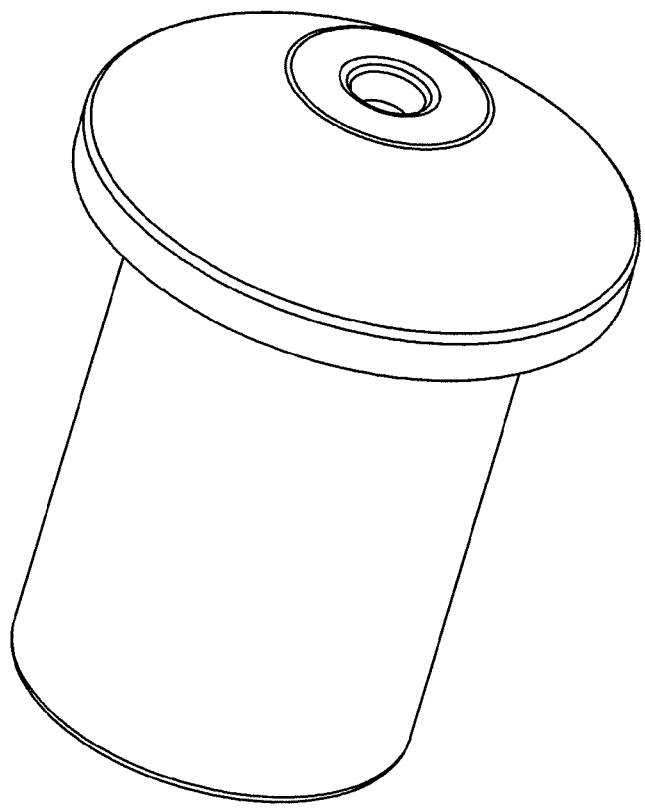
FIG. 6 is a perspective view showing a second end of the insertion cap of FIG. 5.
Figure 5:
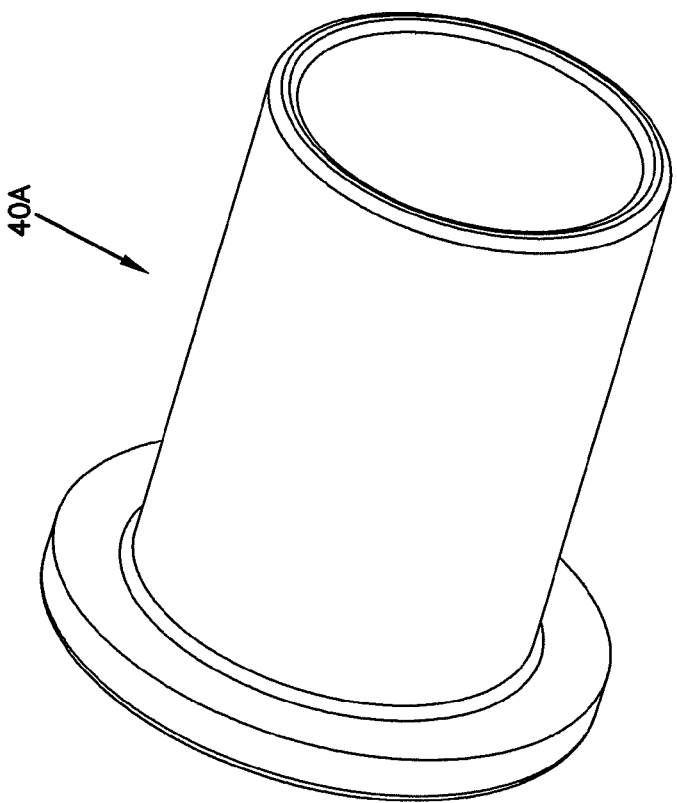
FIG. 5 is a perspective view showing a first end of a first insertion cap that can be used with the fiber optic connector of FIG. 1.
Figure 8:
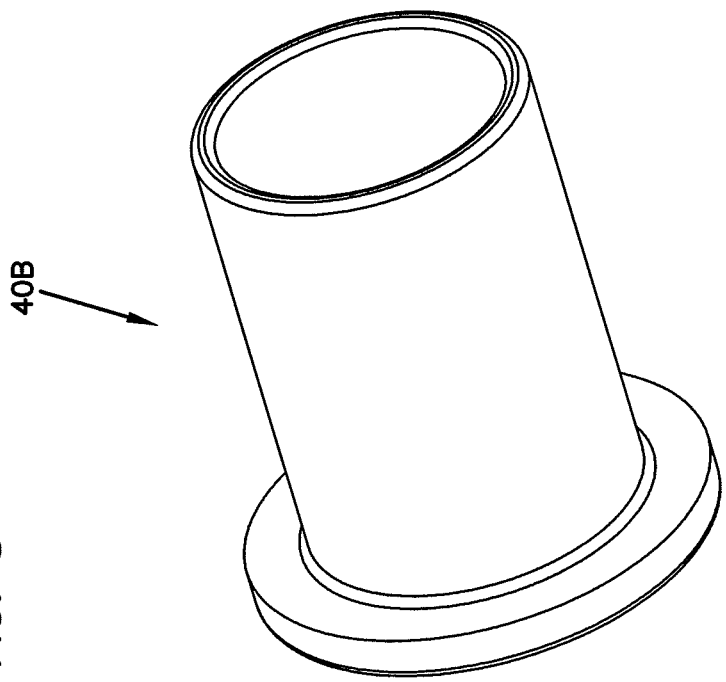
FIG. 8 is a perspective view showing a first end of a second insertion cap that can be used with the fiber optic connector of FIG. 1.
Figure 9:
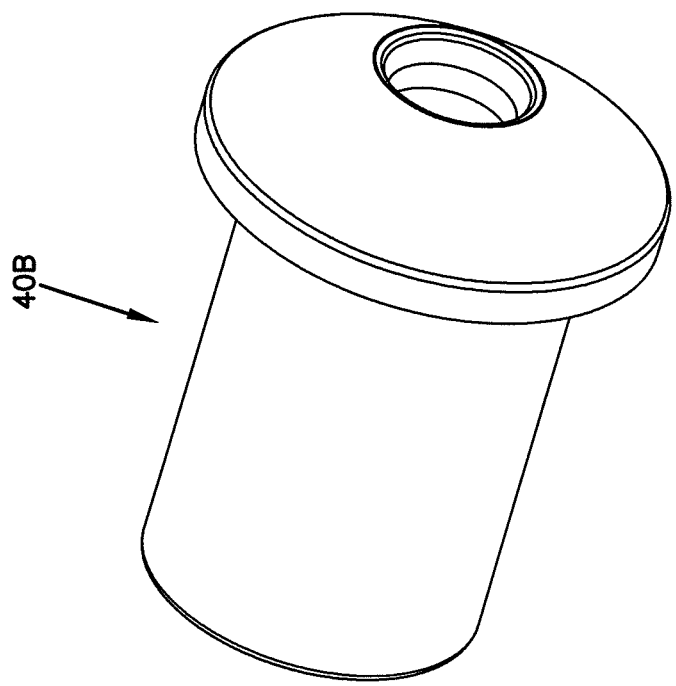
FIG. 9 is a perspective view showing a second end of the insertion cap of FIG. 8.
Figure 10:
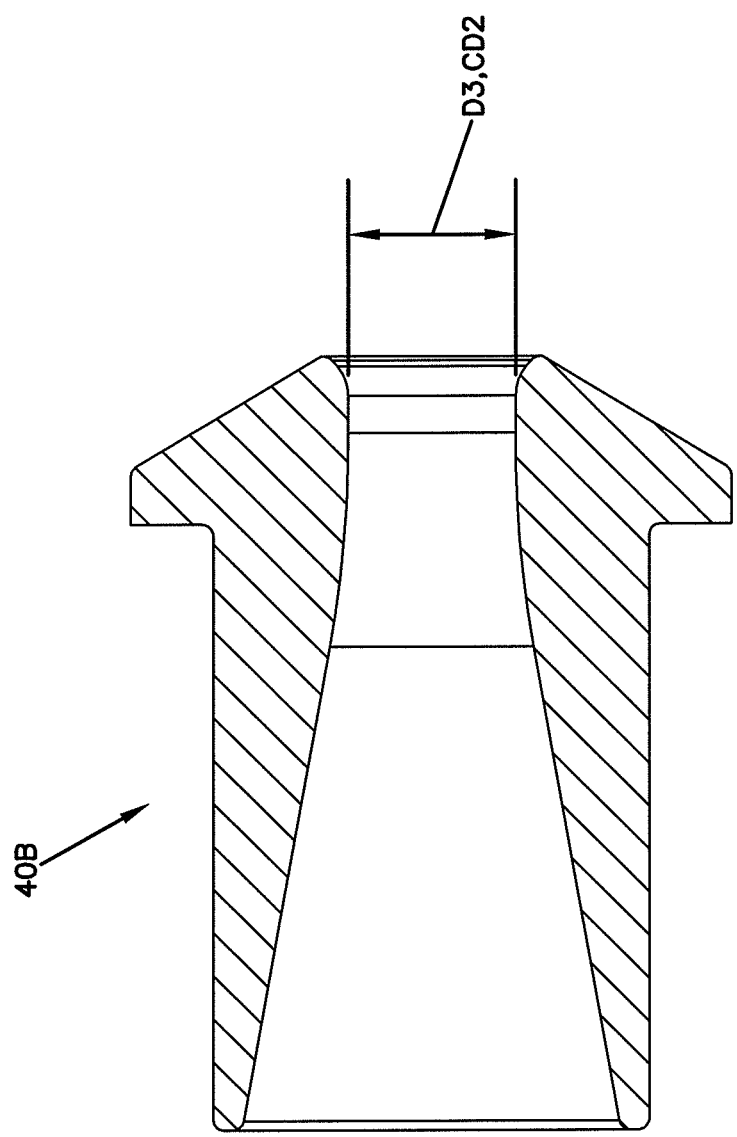
FIG. 10 is a cross-sectional view that bisects the insertion cap of FIGS. 8 and 9.

As shown at FIG. 2, the insertion cap 40A (see FIGS. 5-7) is mounted within the proximal end 42 of the proximal housing portion 36 of the connector housing 32. The insertion cap 40A has an inner diameter $D_2$ sized to correspond with the outer diameter of the coating layer 94. In alternative embodiments, it may be desirable to cover/protect the portion of the optical fiber 50 extending through the connector housing 32 with a protective layer such as a 900 micron tube (e.g., a 900 micron furcation tube). To accommodate such a protective tube, the insertion cap 40A can be replaced with an insertion cap 40B (see FIGS. 8-10) having an inner diameter $D_3$ that is larger than the inner diameter $D_2$. In certain embodiments, inner diameter $D_3$ can correspond to the outer diameter of protective buffer tube provided about the coating layer 94 of the optical fiber 50 within the connector housing 32.

The fiber optic connector 20 is a pull-proof connector in which the strength layer 52 of the fiber optic cable 46 is anchored to the connector housing 32 thereby preventing tensile loads from being transferred to the ferrule assembly 26. Because of this configuration, movement of the ferrule 28 in a proximal direction relative to the connector housing 32 causes the optical fiber 50 to be forced/displaced in a proximal direction relative to the connector housing 32 and the jacket 48 of the fiber optic cable 46. In the depicted embodiment, the ferrule 28 has a maximum axial displacement AD in the proximal direction during the connection process. The axial displacement AD creates an excess fiber length having a length equal to the length of the axial displacement AD. In certain embodiments, the maximum axial displacement AD can be 0.035 inches.

With regard to the axial displacement AD described above, it is significant that the relatively small diameter of the fiber optic cable 46 and the lack of open space within the interior of the jacket 48 do not allow the cable 46 to readily accommodate acceptable macrobending of the optical fiber 50 within the jacket 48 when the ferrule 28 is forced in a proximal direction relative to the connector housing 32. Therefore, to prevent signal degradation related to microbending caused by the axial displacement of the optical fiber 50 in the proximal direction, the connector 20 is itself preferably configured to take-up the excess fiber length corresponding to the axial displacement. To take-up the excess fiber length, the fiber optic connector 20 includes features that encourage a controlled, predictable and repeatable macrobend of the optical fiber 50 within the connector housing 32 when the ferrule 28 is forced in a proximal direction relative to the connector housing 32. In this way, the fiber optic connector 20 itself accommodates the acceptable macrobending of the optical fiber 50 such that the optical fiber 50 does not need to slide within the jacket 48 of the fiber optic cable 46 and does not require the optical fiber 52 to macro or microbend within the jacket 48 of the fiber optic cable 46 when the ferrule 28 is forced in a proximal direction relative to the connector housing 32.

Figure 4:
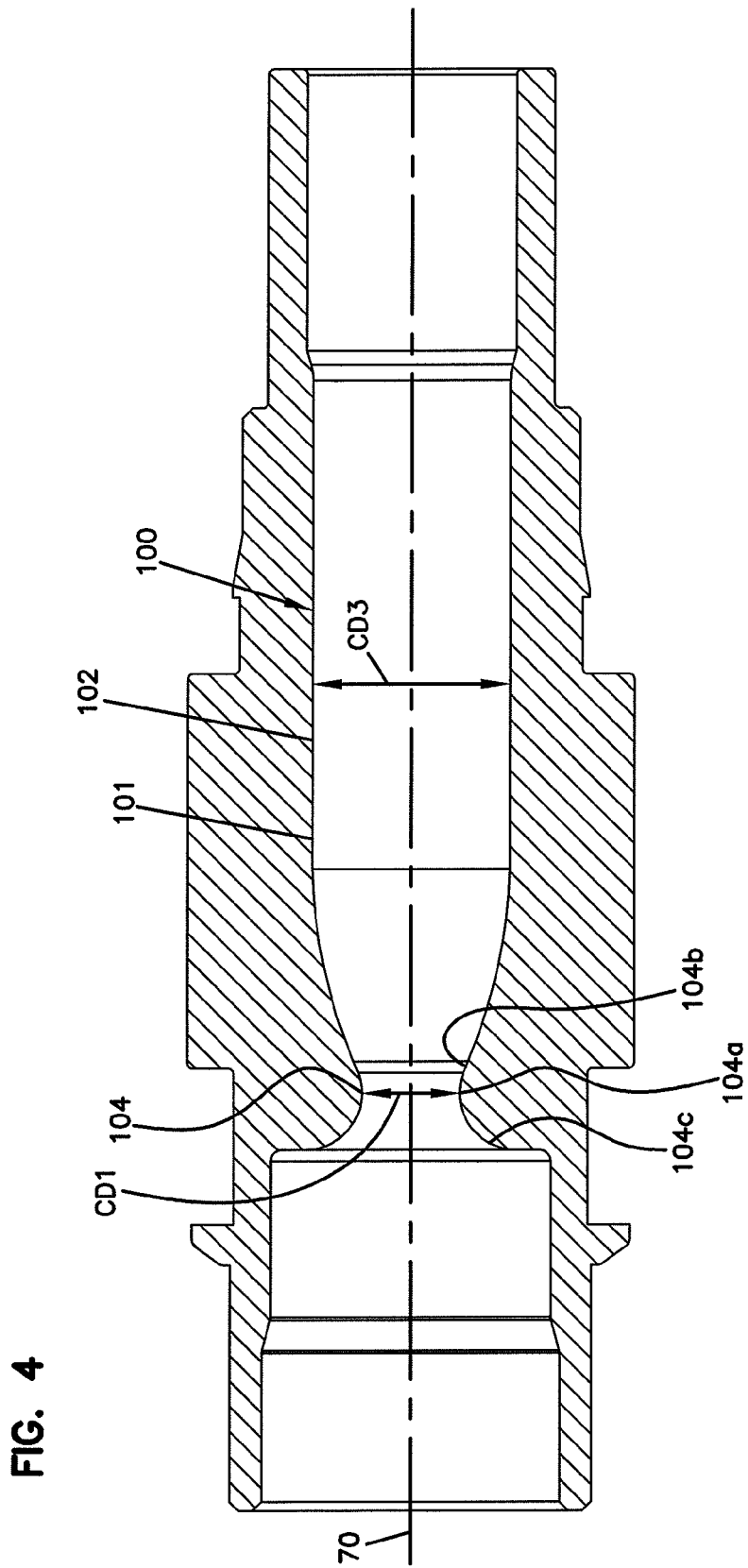
FIG. 4 is a cross-sectional view that longitudinally bisects the rear housing of FIG. 3.

To prevent unacceptable signal degradation, the fiber optic connector 20 is preferably designed to take-up the optical fiber length corresponding to the axial displacement AD. For example, referring to FIG. 2, the connector housing 32 includes a fiber take-up region 100 that extends generally from a proximal end of the spring 31 to the proximal end 42 of the proximal housing portion 36. The fiber take-up region 100 includes a passage 101 that extends along the axis 70. As shown at FIG. 2, the passage 101 has an intermediate section 102, a distal section 104 and a proximal section 106. The intermediate section 102 has an enlarged transverse cross-sectional area as compared to the transverse cross-sectional areas of the distal and proximal sections 104, 106. The transverse cross-sectional areas are taken along planes perpendicular to the longitudinal axis 70 of the connector 20. The distal section 104 and the intermediate section 102 are defined by the proximal housing portion 36 (see FIG. 4). The distal section 104 of the passage 101 has a necked configuration with a neck portion 104a positioned between transition portions 104b and 104c. The neck portion 104a defines a minimum cross-dimension CD1 (e.g., an outer diameter) and minimum transverse cross-sectional area of the distal section 104. The transition portion 104b provides a gradual reduction in transverse cross-sectional area (i.e., a funnel or taper toward the longitudinal axis 70) as the transition portion 104b extends from the intermediate section 102 of the passage 101 toward the neck portion 104a. The transition portion 104c provides a gradual increase in transverse cross-sectional area (i.e., a funnel or taper away from the longitudinal axis 70) as the transition portion 104c extends from the neck portion 104a toward the spring 31.

The proximal section 106 of the passage 101 is defined by the inside of the insertion cap 40A or the insertion cap 40B (depending on which one is selected). For ease of explanation, the description herein will primarily refer to the insertion cap 40A (see FIGS. 5-7). A minimum cross-dimension CD2 (e.g., an outer diameter) of the proximal section 106 is defined near a proximal end of the insertion cap 40A. The proximal section 106 includes a transition 106a that provides a reduction in transverse cross-sectional area as the transition 106a extends in a proximal direction from the intermediate section 102 of the passage 101 toward the minimum cross-dimension CD2. A chamfer 109 at the proximal end of the insertion cap 40A provides an increase in transverse cross-sectional area as the chamfer 109 extends proximally from the minimum cross-dimension C2. The chamfer 109 can assist in providing bend radius protection with respect to the fiber passing through the insertion cap 40A. It will be appreciated that by using the insertion cap 40B, the minimum diameter provided by the insertion cap can be enlarged so as to accommodate a productive buffer tube covering the optical fiber 50 within the passage 101.

In certain embodiments, the minimum cross-dimension CD1 is greater than the minimum cross-dimension CD2. In other embodiments, the minimum cross-dimension CD1 is at least twice as large as the minimum cross-dimension CD2. In other embodiments, the minimum cross-dimension CD1 is generally equal to the minimum cross-dimension CD2. In still further embodiments, a maximum cross-dimension CD3 of the passage 101 is at least 1.5 times or 2 times as large as the minimum cross-dimension CD1. In still other embodiments, the maximum cross-dimension CD3 of the passage 101 is at least 2, 3 or 4 times as large as the minimum cross-dimension CD2.

It will be appreciated that the length and transverse cross-sectional dimensions of the fiber take-up region 100 are selected to accommodate the excess length of fiber corresponding to the axial displacement distance AD. When the ferrule 28 is pushed in a proximal direction, the configuration of the fiber take-up region 100 causes the optical fiber 50 to move from a generally straight path SP along the axis 70 to a path that follows generally along a single macrobend 120 (shown at FIG. 2) that extends along the surface of the fiber take-up region 100 from the distal section 104 through the intermediate section 102 to the proximal section 106. The increase in length between the straight path and the curved path equals the axial displacement distance AD. The transitions 104b, 106a provided at the proximal and distal sections 104, 106 of the passage 101 help to encourage the fiber to form the single microbend in a predictable, repeatable manner as the ferrule 28 is forced in a proximal direction relative to the connector housing 32 during a connection process. In certain embodiments, the fiber take-up region is configured to take up at least 0.015 inches, or at least 0.025 inches or at least 0.035 inches of excess fiber length.

In addition to the advantages provided above, the transition 104b also facilitates assembly of the fiber optic connector 20. Specifically, during assembly, the optical fiber 50 is inserted in a distal direction through the proximal end 42 of the connector housing 32 and is directed through the length of the connector housing into the ferrule 28. The transition 104b assists in guiding the fiber 50 into the ferrule 28 during the fiber insertion process.

Referring to FIG. 7, the insertion cap 40A includes a sleeve portion 110 having a cylindrical outer surface that fits inside the proximal end 42 of the connector housing 32. The insertion cap 40A also includes a flange 112 at a proximal end of the sleeve portion 110. The flange 112 projects radially outwardly from the cylindrical outer surface of the sleeve portion 110 and forms a proximal end of the insertion cap 40A. The flange 112 abuts against the proximal end 42 of the connector housing 32 when the insertion cap 40A is inserted therein. The inside of the insertion cap 40A defines the proximal section 106 of the passage 101 which extends in a proximal to distal direction through the insertion cap 40A. The insertion cap 40B has a similar configuration as the insertion cap 40A, except the minimum inner cross-dimension CD2 (e.g., inner diameter) of the insertion cap 40B is larger than the minimum cross-dimension CD2 of the insertion cap 40A so as to better accommodate a protective tube covering the coated fiber 50 within the connector housing 32.

The use of the insertion cap 40A or the insertion cap 40B allows the proximal end 42 of the connector housing 32 to have a relatively large open transverse cross-sectional area which corresponds to the maximum cross-dimension CD3 of the passage 101. This large transverse cross-sectional area is advantageous because it facilitates delivering potting material (e.g., and adhesive material such as epoxy) to the back side of the ferrule 28 during assembly for potting the fiber 50 within the ferrule 28. Typically, a needle can be used to deliver potting material to the ferrule 28. The large cross-sectional area provides better access for allowing a needle to be inserted through the proximal end of the connector housing 32 to accurately injecting potting material into the ferrule 28.

Referring to FIG. 1, the crimp sleeve 44 of the fiber optic connector 20 includes a sleeve portion 140 and a stub portion 142 that projects proximately outwardly from a proximal end of the sleeve portion 140. A radial in-step 141 is provided between the sleeve portion 140 and the stub portion 142 such that the sleeve portion 140 has a larger diameter than the stub portion 142. A passage extends axially throughout the length of the crimp sleeve 44. The passage has a smaller diameter through the stub portion 142 and a larger diameter through the sleeve portion 140. When the fiber optic connector 20 is assembled, the sleeve portion 140 is crimped about the exterior surface of the connector housing 32 adjacent the proximal end 42 of the connector housing 32 (see FIG. 2). The exterior surface of the connector housing 32 can be textured (e.g., knurled, ridged, provided with small projections, etc.) to assist in retaining the crimp on the housing 32. Preferably, a distal portion of the strength layer 52 of the fiber optic cable 46 is crimped between the sleeve portion 140 and the exterior surface of the connector housing 32 such that the strength layer 52 of the cable 46 is anchored relative to the connector housing 32.

In certain embodiments (e.g., as shown in FIG. 1), the sleeve portion 140 of the crimp sleeve may include an annular rib 143 on an exterior surface thereof. The annular rib 143 may provide additional material for the crimp sleeve 44 at spots or regions that will tend to deform when the crimp sleeve 44 is crimped at the sleeve portion 140.

The stub portion 142 fits within a pocket 144 provided within the strain relief boot 56. The stub portion 142 coaxially aligns with the central longitudinal axis 70 of the fiber optic connector 20. The insertion cap 40A is captured between the proximal end 42 of the connector housing 32 and the crimp sleeve 44. In this way, the crimp sleeve 44 assists in retaining the insertion cap 40A in the proximal end 42 of the connector housing 32. The insertion cap 40A can also be held within the connector housing 22 by an adhesive material such as epoxy.

In certain embodiments, it can be advantageous to crimp the stub portion 142 of the crimp sleeve against the outer jacket 48 of the fiber optic cable 46 such that any space between the outer jacket 48 and the optical fiber 50 is eliminated within the cable 46 and the optical fiber 50 gets pinched against the inner surface of the jacket 48 of the fiber optic cable 46. As such, the optical fiber 50, as well as the strength layer 52, can be anchored relative to the connector housing 32 adjacent the proximal end 42 thereof. The location where the optical fiber 52 itself is crimped to the connector housing 32 may be called the fiber anchor location 51 (see FIG. 2).

Anchoring the optical fiber 50 relative to the proximal end 42 of the connector housing 32 can isolate the movable ferrule assembly 26 from the rest of the fiber optic cable 46 that is not pinched or crimped to the connector housing 32. This is advantageous because, if the optical fiber 50 were not anchored to the connector housing 32, in certain instances, the optical fiber 50 may slide within the outer jacket 48, interfering with the predictability and the repeatability of the macrobending that takes place within the fiber take-up region 100 when the ferrule 28 is forced in a proximal direction. For example, if a long fiber optic cable 46 were to be spooled around a spool structure, the fiber 50 might tend to migrate toward the inner diameter side of the cable within the cable and might move a different distance than the outer jacket 48 itself. If the fiber 50 were to slide within the outer jacket 48 toward the ferrule assembly 26, that would create extra fiber within the connector, interfering with the predictability of the acceptable macrobending that takes place within the fiber take-up region 100.

In other instances, for example, if a tensile load was applied to the cable in a proximal direction away from the connector, the outer jacket 48 of the cable 46 might stretch inelastically and the optical fiber 50 could slidably move within the jacket, relative to the jacket, causing a pulling force on the ferrule assembly 26. Thus, by anchoring the optical fiber 50 to the connector housing 32 adjacent the proximal end 42 through the use of the crimp sleeve 44, the movable ferrule assembly 26 is isolated from the rest of the fiber optic cable 46 that is not crimped to the connector housing 32. As such, axial load is not transferred in either direction across the anchor location. The anchor restricts/prevents relative movement between the optical fiber and the jacket at the fiber anchor location. In this way, the portion of the fiber within the connector and the portion of the fiber within the main length of the cable are mechanically isolated from one another. The connector of the present disclosure, thus, can operate as designed and utilize the fiber take-up region 100 to provide for a predictable and a repeatable macrobend when the ferrule is moved in a proximal direction relative to the connector housing 32.

FIGS. 60-65 illustrate two different embodiments of crimp sleeves 544, 644 that include annular ribs on an exterior surface of the stub portions thereof. Even though the other embodiments of the crimp sleeves disclosed in the present application can be used to crimp the stub portion thereof against the outer jacket 48 of the fiber optic cable 46 such that the optical fiber 50 gets pinched against the inner surface of the jacket 48 of the fiber optic cable 46, the crimp sleeves 544 and 644 shown in FIGS. 60-65 may provide for additional material for the stub portions of the crimp sleeve at spots or regions that might tend to deform when the crimp sleeve is crimped at the stub portion.

Figure 60:
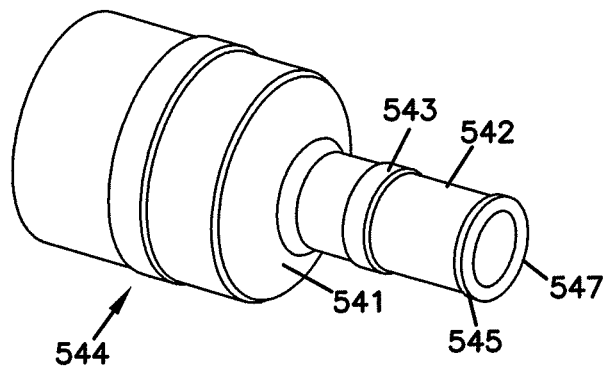
FIG. 60 is a rear perspective view of an example embodiment of a crimp sleeve that might be used to anchor the optical fiber to the connector housing of a fiber optic connector.
Figure 61:
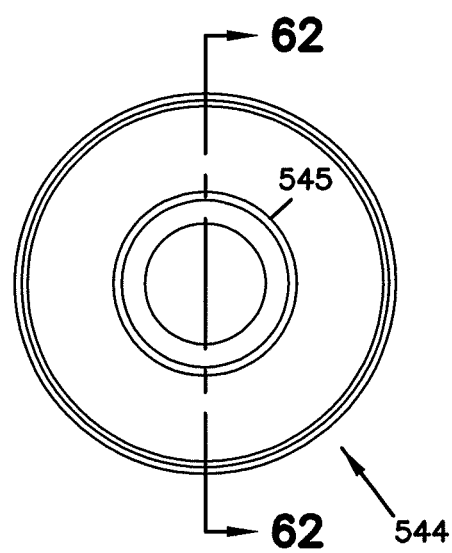
FIG. 61 is a rear view of the crimp sleeve of FIG. 60.
Figure 62:
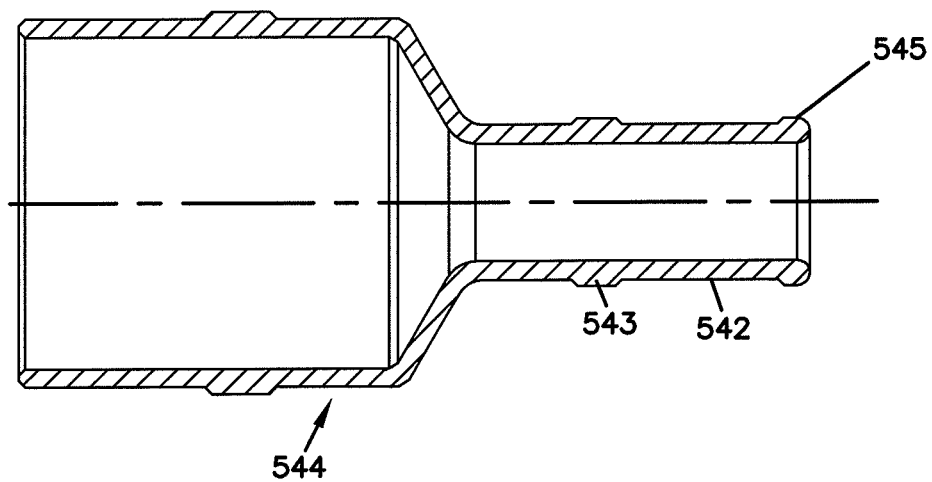
FIG. 62 is a cross-sectional view taken along lines 62-62 of FIG. 61.

In the embodiment of the crimp sleeve 544 shown in FIGS. 60-62, the stub portion 542 of the sleeve 544 includes a first annular rib 543 at a proximal end 547 thereof and a second annular rib 545 at an intermediate location between the proximal end 547 and the radial in-step 541 of the crimp sleeve 544.

Figure 63:
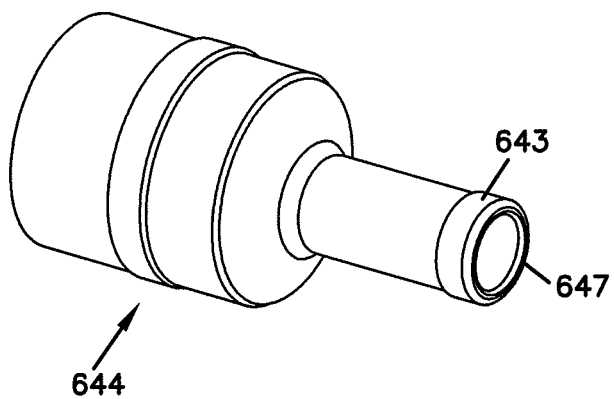
FIG. 63 is a rear perspective view of another example embodiment of a crimp sleeve that might be used to anchor the optical fiber to the connector housing of a fiber optic connector.
Figure 64:
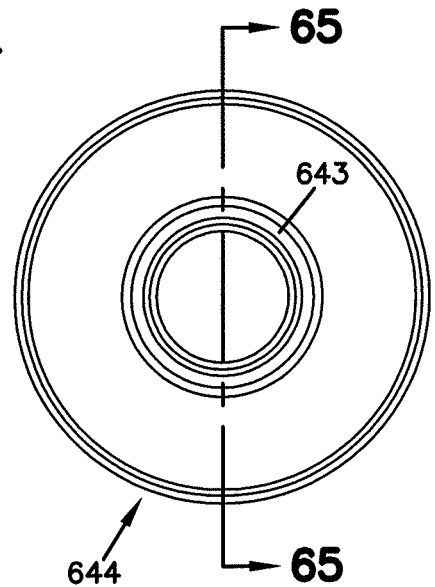
FIG. 64 is a rear view of the crimp sleeve of FIG. 63.
Figure 65:
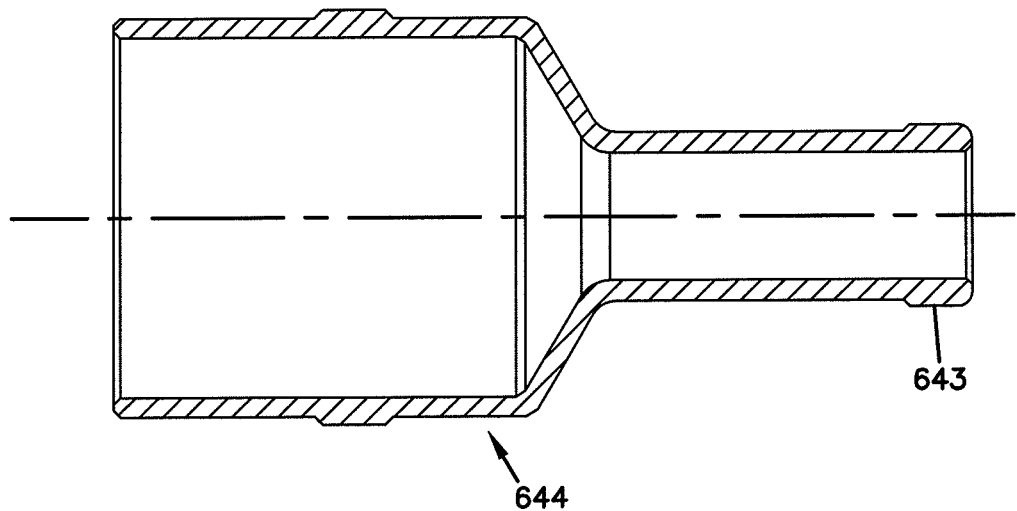
FIG. 65 is a cross-sectional view taken along lines 65-65 of FIG. 61.

In the embodiment of the crimp sleeve 644 shown in FIGS. 63-65, the stub portion 642 of the sleeve 644 includes a single, wider annular rib 643 at a proximal end 647 thereof.

In the depicted embodiment, the fiber anchor location is defined as being at a location that is not at a splice location where two segments of optical fiber are spliced together. In the present disclosure, the optical fiber is directly terminated in the connector and the connector is not a splice-on connector.

To assemble the fiber optic connector 20, the ferrule assembly 26 is first loaded into the distal housing portion 34 of the connector housing 32. Next, the proximal housing portion 36 is connected to the distal housing 34 (e.g., by a snap fit connection) such that the ferrule hub 30 and the spring 31 are captured within the connector housing 32 at a location between the distal housing portion 34 and the proximal housing portion 46. Next, an epoxy needle is inserted through the proximal end 42 of the proximal housing portion 36 and is used to inject epoxy into the fiber passage defined through the ferrule 28. Once the epoxy has been applied, the epoxy needle is removed and the insertion cap 40A or the insertion cap 40B is inserted into the proximal end 42 of the connector housing 32. Thereafter, the strain relief boot 56 and the crimp sleeve 44 are inserted over the fiber optic cable 46 and a distal end portion of the cable is prepared.

As part of the cable preparation process, the jacket 48 is stripped from the distal end portion of the optical fiber. Also, the coating layers 94 are stripped from the distalmost portion of the optical fiber 50 intended to be inserted through the passage defined by the ferrule 28. Moreover, the strength layer 52 is trimmed to a desired length. Once the fiber optic cable 46 has been prepared, the distal end portion of the optical fiber 50 is inserted through the insertion cap 40A and into the ferrule 28 which has been potted with epoxy. During the insertion process, the transition 104b assists in guiding the distalmost end portion of the optical fiber 50 into the ferrule 28. Once the fiber insertion process has been completed, the crimp sleeve 44 is slid distally over the proximal end 42 of the connector housing 32 and used to crimp the distal end of the strength layer 52 about the exterior surface of the connector housing 32 adjacent to the proximal end 42. The strain relief boot 56 is then slid distally over the crimp sleeve 44 and proximal end 42 of the housing 32. Finally, the release sleeve 38 is inserted over the distal end 22 of the fiber optic connector 20 and snapped into place over the connector housing 32.

Figure 11:
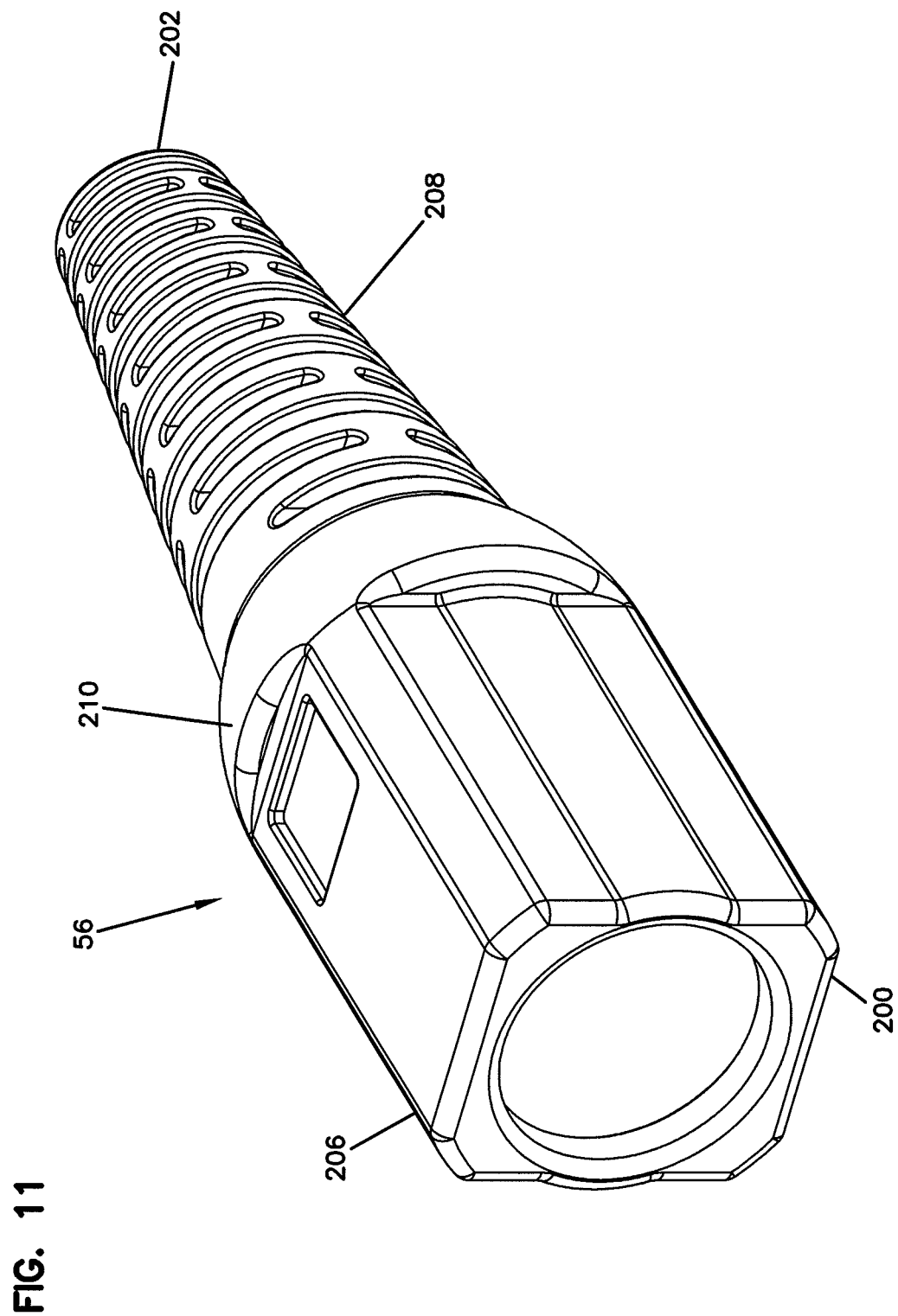
FIG. 11 is a perspective view showing a first end of a strain relief boot of the fiber optic connector of FIG. 1.
Figure 12:
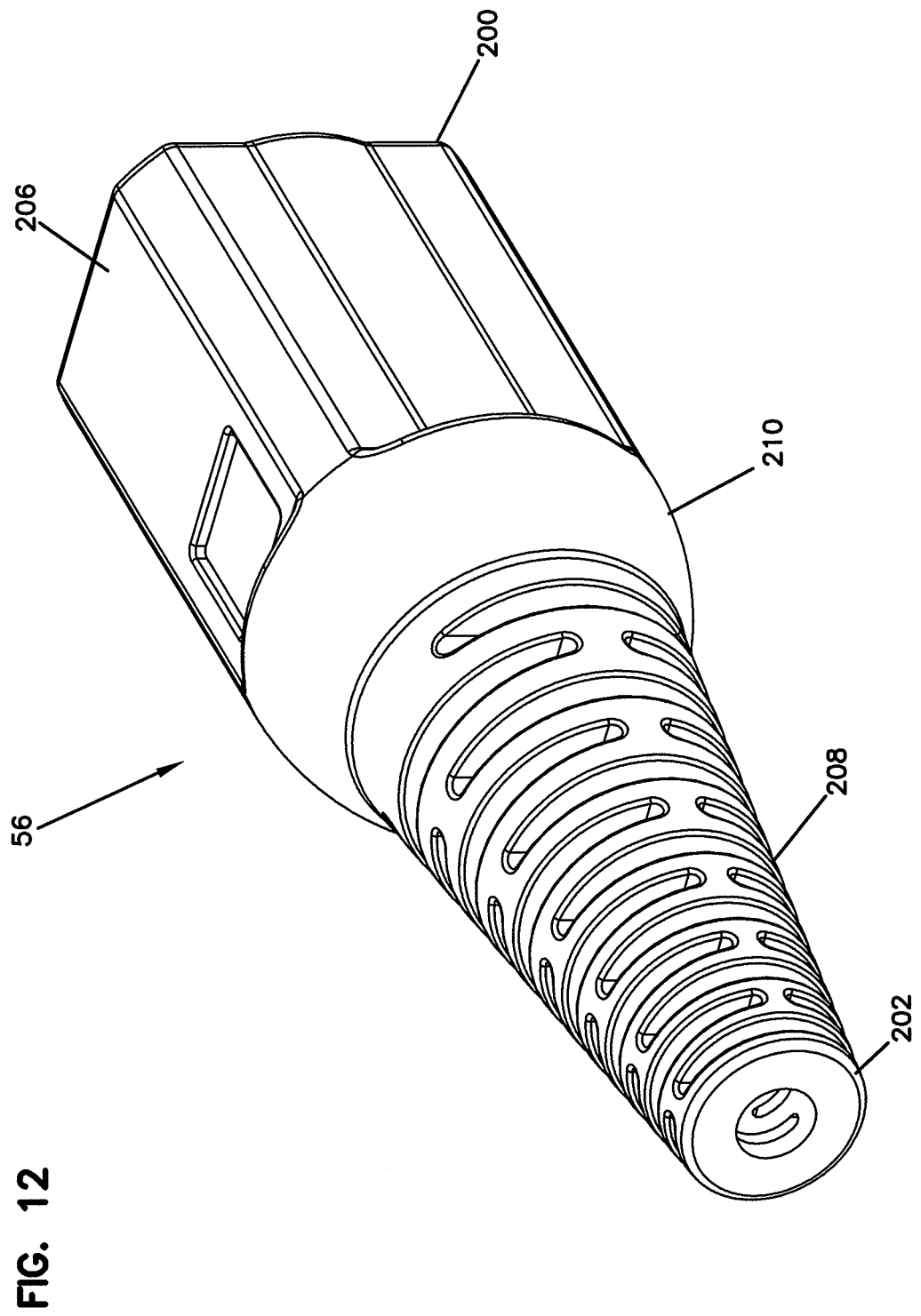
FIG. 12 is a perspective view showing a second end of the strain relief boot of FIG. 11.
Figure 13:
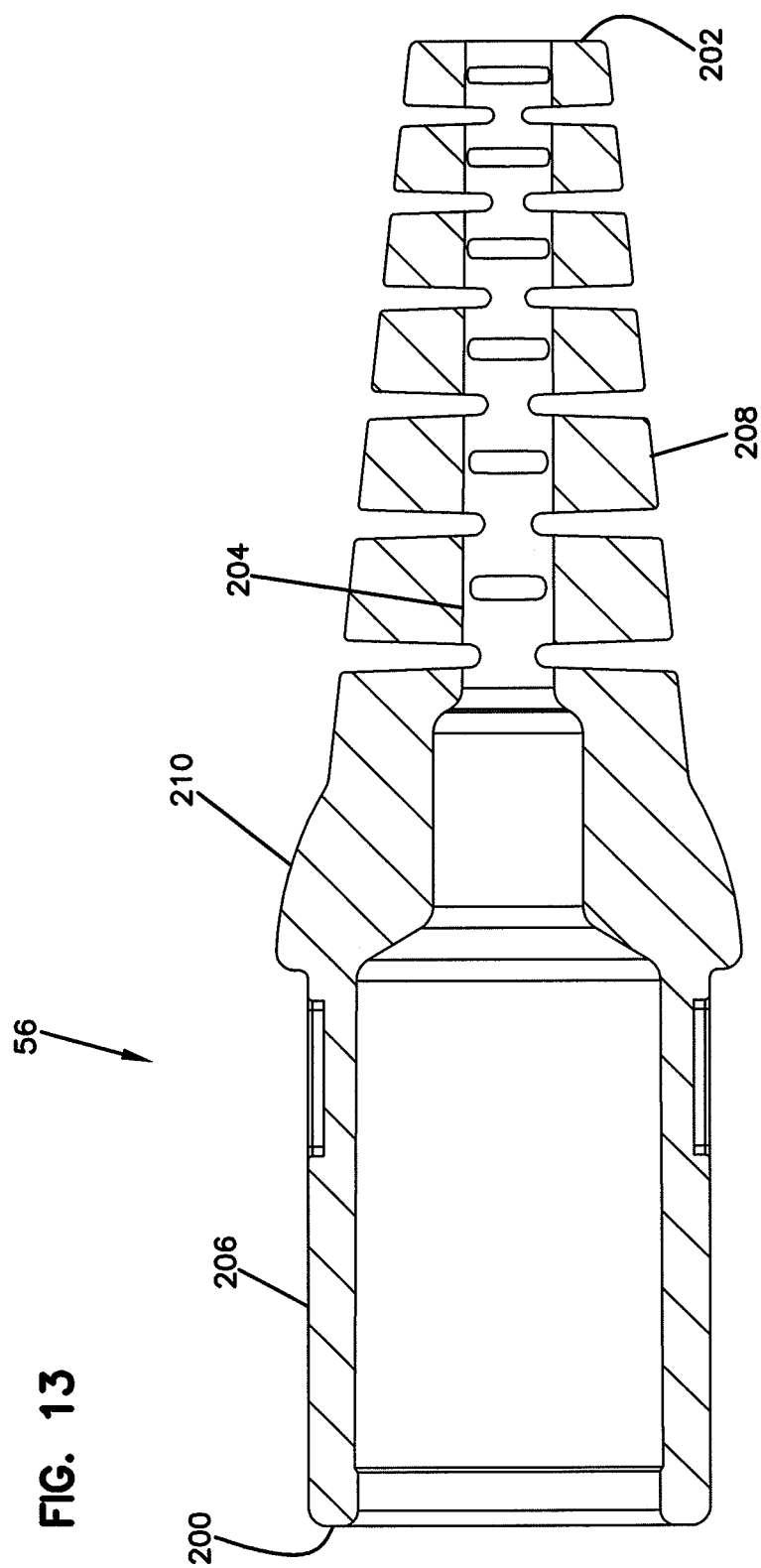
FIG. 13 is a cross-sectional view that longitudinally bisects the strain relief boot of FIGS. 11 and 12.
Figure 14:
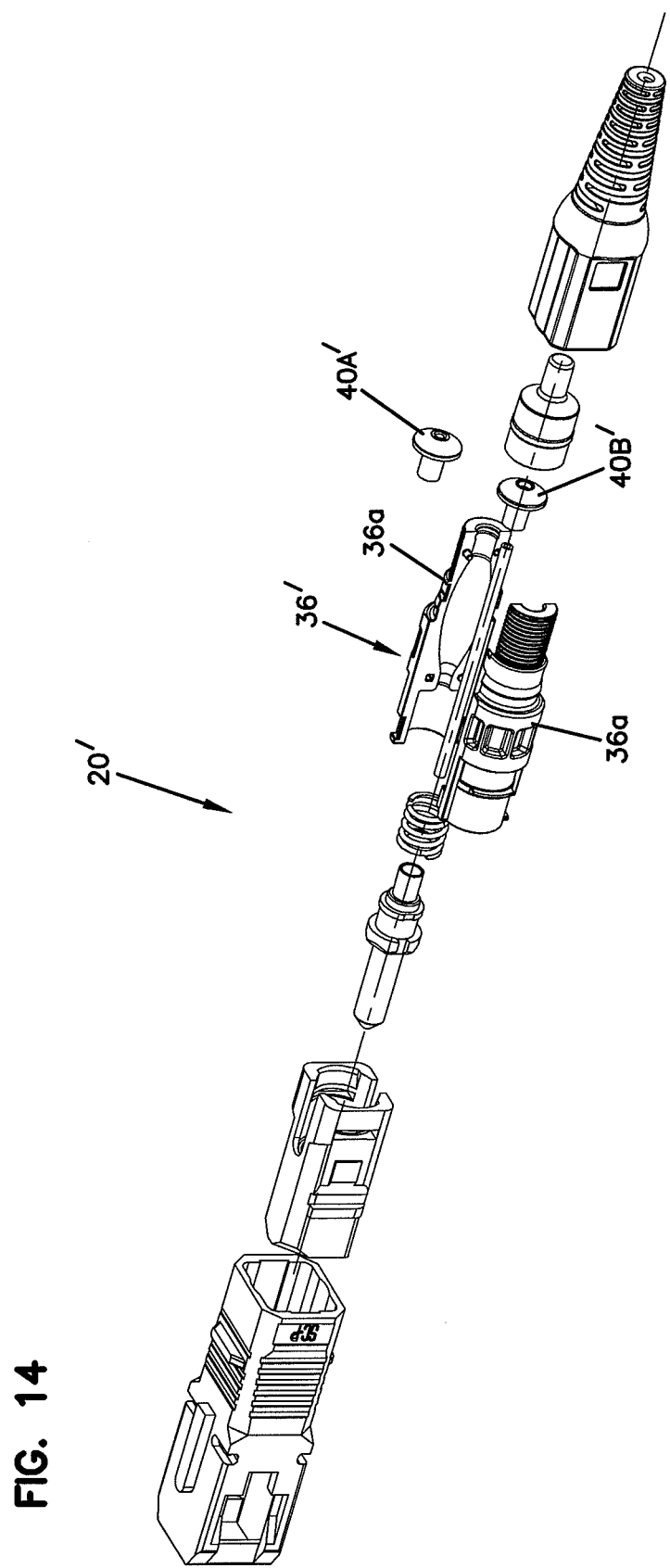
FIG. 14 is an exploded, perspective view of a second fiber optic connector in accordance with the principles of the present disclosure.

Referring to FIGS. 11-13, the strain relief boot 56 of the fiber optic connector 20 includes a distal end 200 and an opposite proximal end 202. The strain relief boot defines an inner passage 204 that extends through the boot from the proximal end 202 to the distal end 200. When the boot 56 is mounted on the connector housing 32, the inner passage 204 aligns with the central longitudinal axis 70 of the fiber optic connector 20. The boot 56 includes a connection portion 206 positioned adjacent the distal end 200 and a tapered, strain relief portion 208 positioned adjacent the proximal end 202. The connection portion 206 has a larger cross-dimension than a corresponding cross-dimension of the tapered, strain relief portion 208. A transition portion 210 is positioned between the connection portion 206 and the tapered, strain relief portion 208. An outer surface of the transition portion provides a gradual increase in cross-dimension as the outer surface extends from the tapered, strain relief portion 208 to the connection portion 206. The outer surface of the transition portion 210 can be pushed to facilitate inserting the connection portion 206 over the proximal end 42 of the connector housing 32 during assembly of the fiber optic connector 20. Further details about the boot 56 are provided in U.S. Provisional Patent Application Ser. No. 61/452,935, which is entitled STRAIN RELIEF BOOT FOR A FIBER OPTIC CONNECTOR, and which has been filed on a date concurrent with the filing of the present application.

Figure 15:
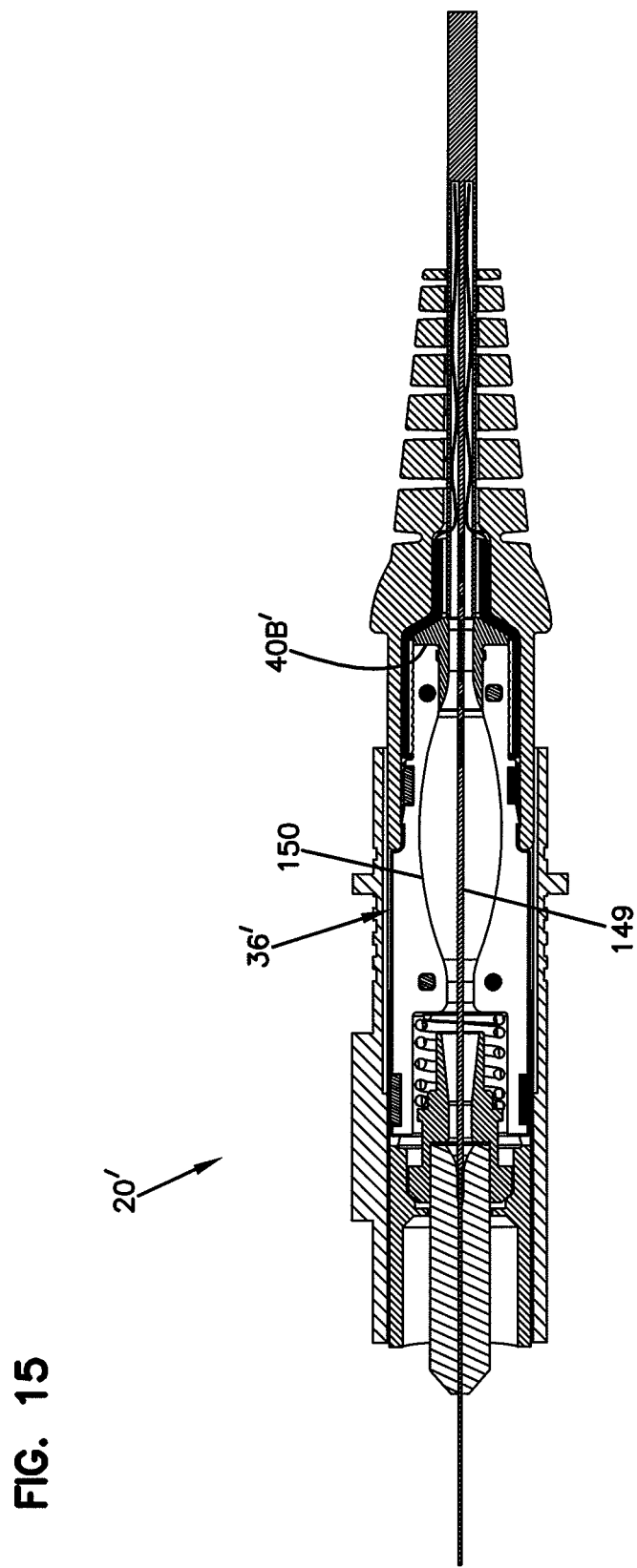
FIG. 15 is a cross-sectional view that longitudinally bisects the fiber optic connector of FIG. 14.
Figure 16:
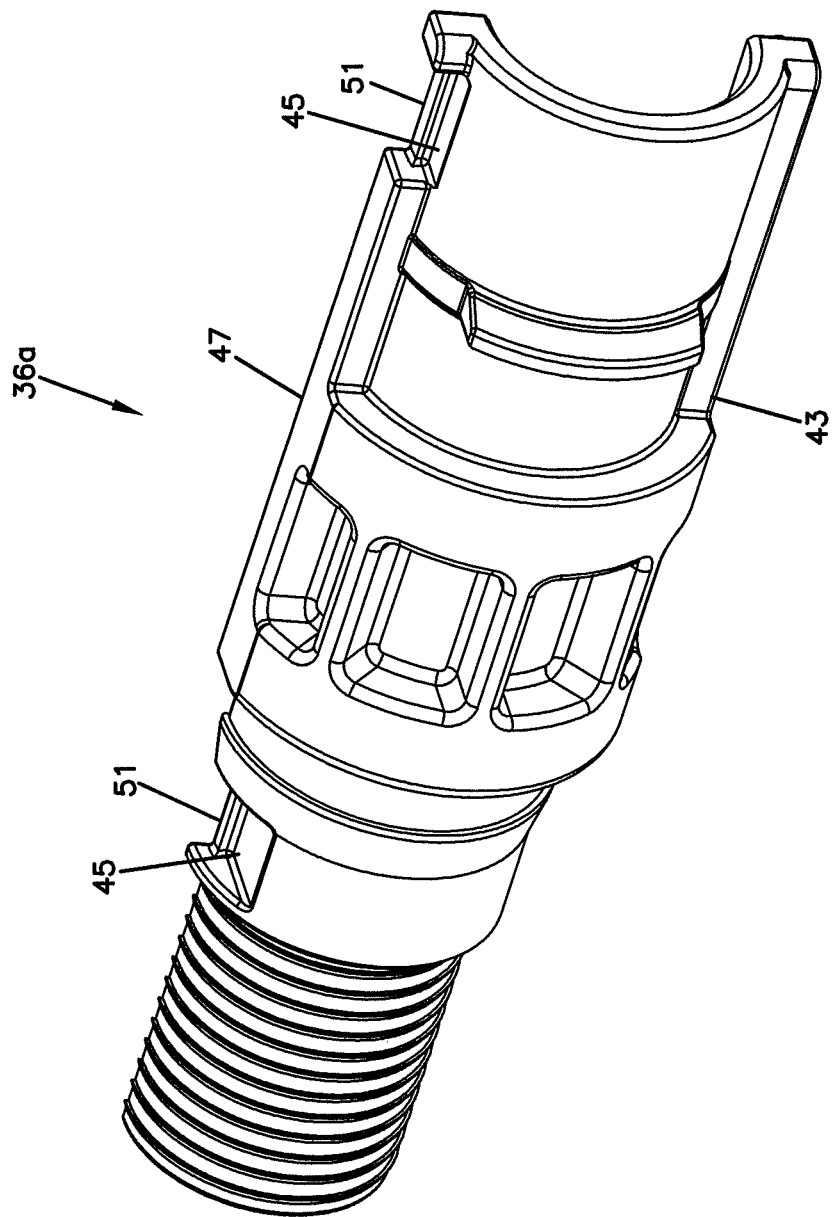
FIG. 16 is a perspective view showing a first side of a half-piece of a rear housing of the fiber optic connector of FIG. 14.
Figure 17:
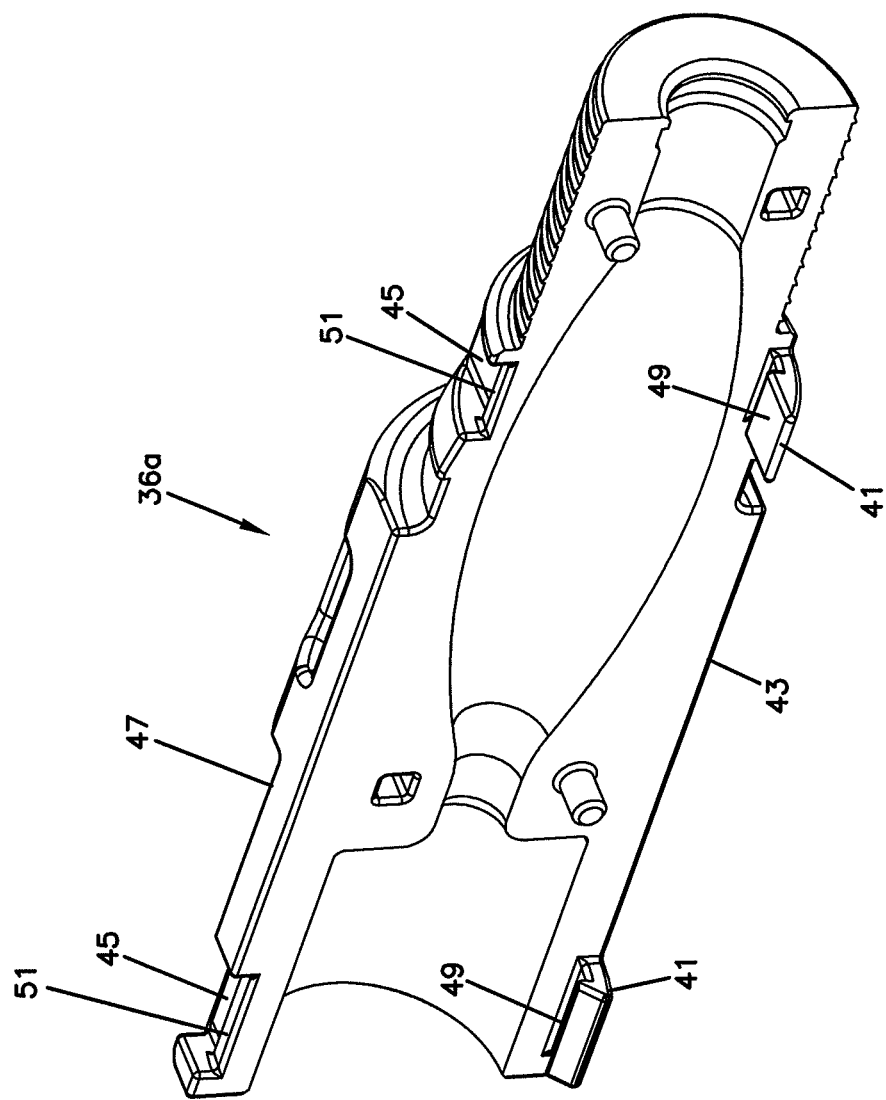
FIG. 17 is a perspective view showing a second side of the half-piece of FIG. 16.
Figure 18:
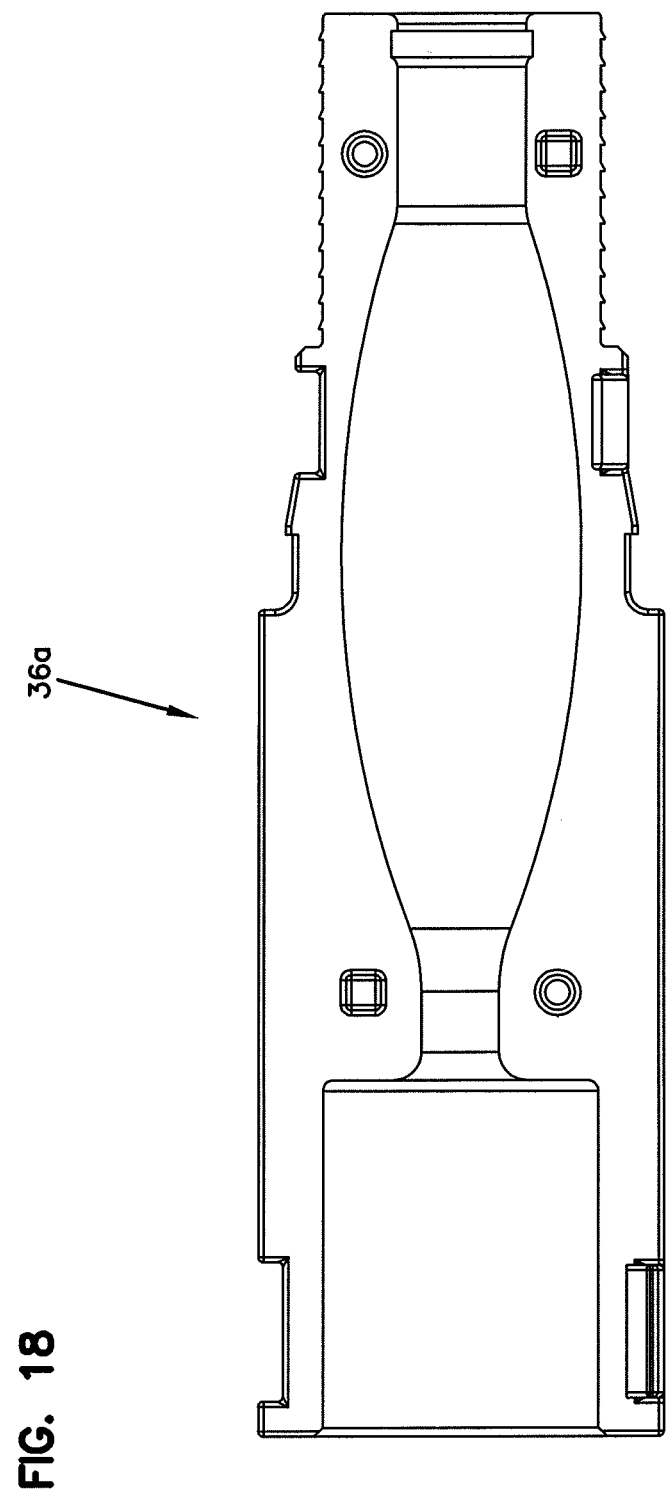
FIG. 18 is side view showing the second side of the half-piece of FIGS. 16 and 17.
Figure 19:
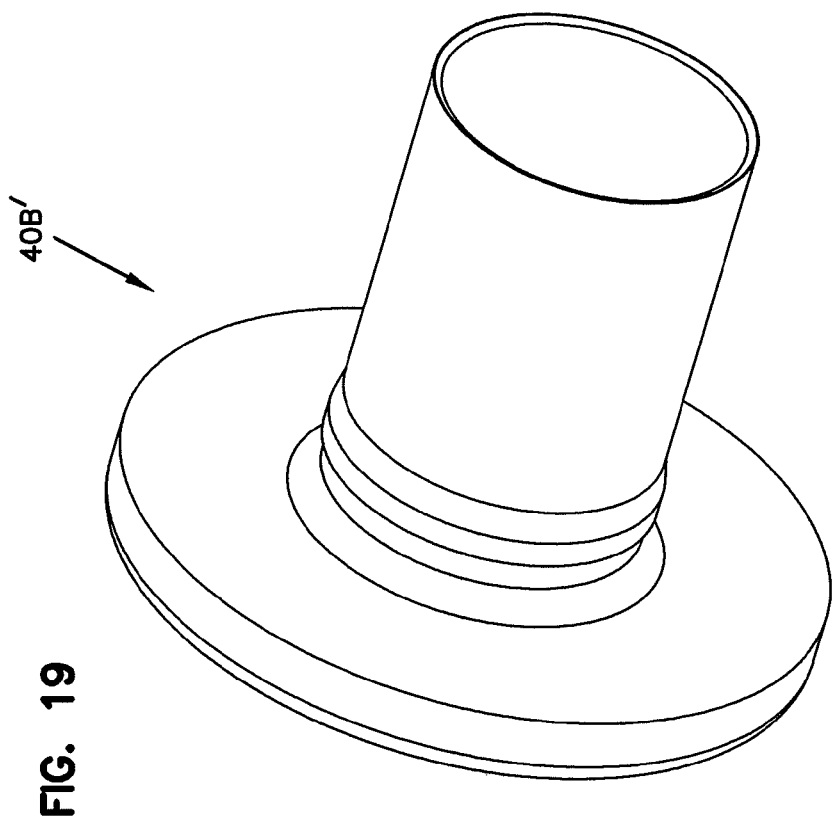
FIG. 19 is a perspective view showing a first end of a first insertion cap that can be used with the fiber optic connector of FIG. 14.
Figure 20:
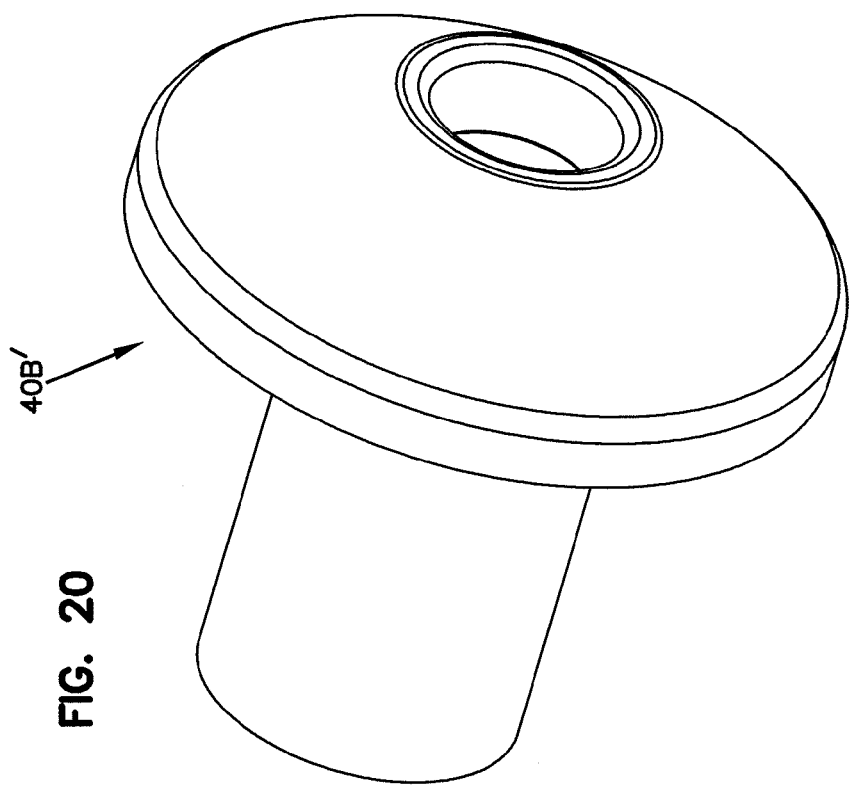
FIG. 20 is a perspective view showing a second end of the insertion cap of FIG. 19.
Figure 21:
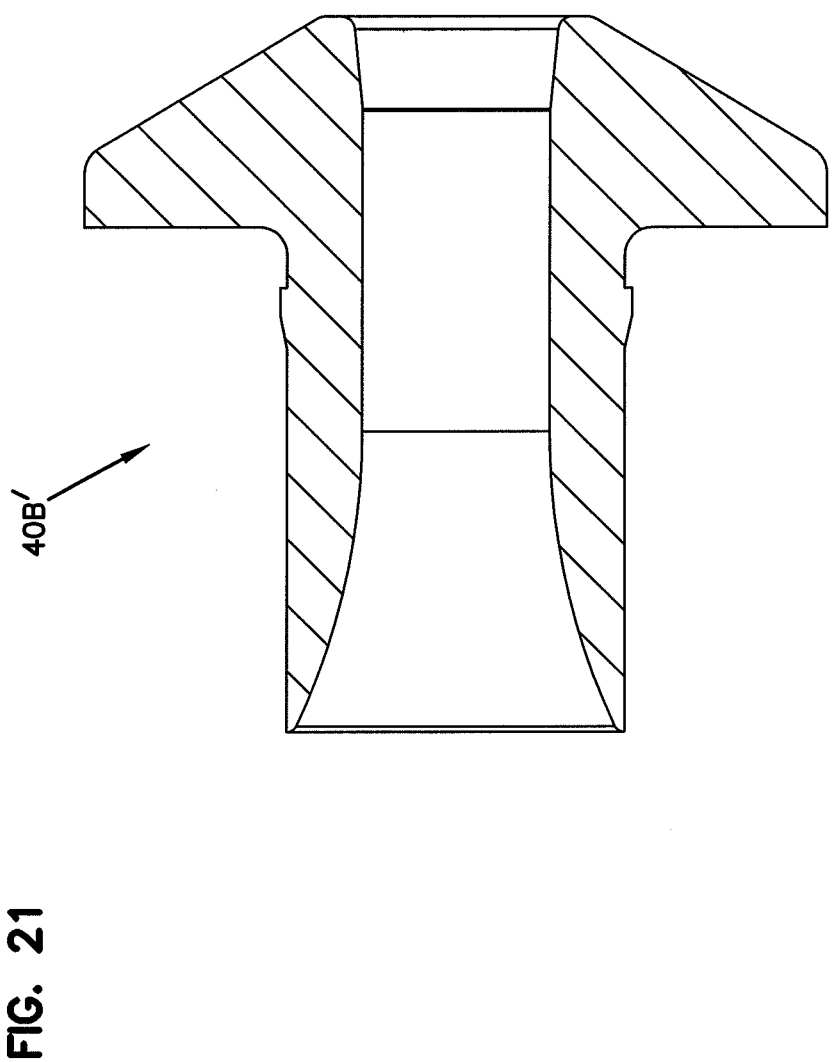
FIG. 21 is a cross-sectional view that longitudinally bisects the insertion cap of FIGS. 19 and 20.
Figure 24:
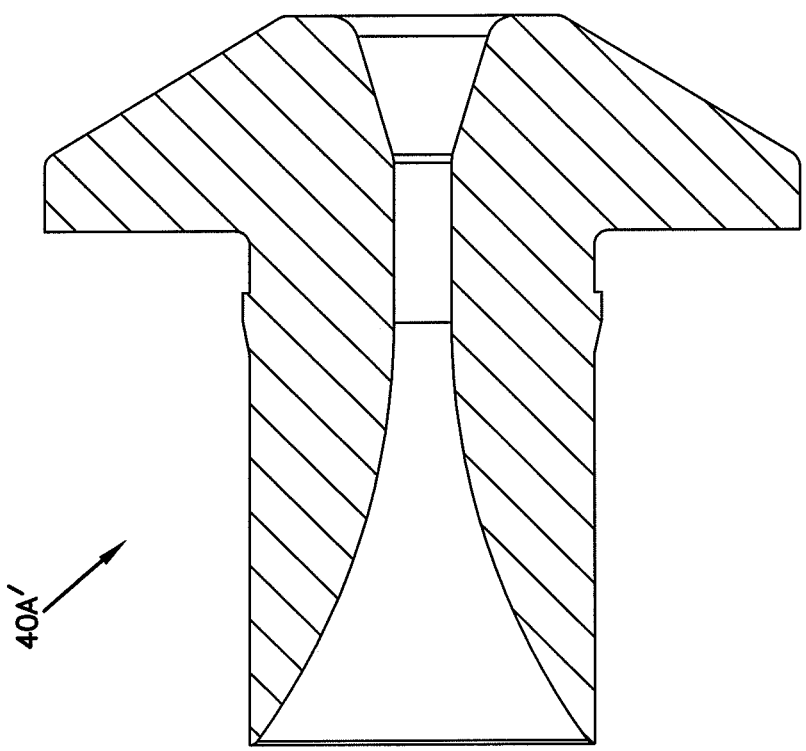
FIG. 24 is a cross-sectional view that longitudinally bisects the insertion cap of FIGS. 22 and 23.

For the connector 20, the proximal housing portion 36, the insertion cap 40A and the insertion cap 40B are all depicted as machined metal parts. FIGS. 14-24 show various parts of another fiber optic connector 20' in accordance with the principles of the present disclosure. The connector 20' has been modified with respect to the connector 20 so as to include a proximal housing portion 36', an insertion cap 40A' and an insertion cap 40B' which are all made of molded plastic. The other components of the connector 20' are the same as the connector 20. In FIG. 15, the insertion cap 40B' is shown installed within the connector 20', and a protective outer tube 149 is shown protecting the portion of the coated optical fiber 50 that extends from the proximal side of the ferrule to the boot. The proximal housing portion 36' is formed by two molded half-pieces 36a that mate together to form the proximal housing portion 36'. The half-pieces 36a can be bonded together with an adhesive or held together mechanically by one or more fasteners such as crimps. According to certain embodiments, the half-pieces 36a may be held together by a snap-fit interlock. According to the example embodiment depicted in FIGS. 14-24, each half piece 36a includes flexible cantilever arms 41 on one side 43 of the half-piece 36a and notches 45 on the radially opposite side 47 of the half-piece 36a (see FIGS. 16-17). Each cantilever arm 41 defines a tab 49 at the end of the arm 41 that is configured to snap over shoulders 51 defined at the notches 45 when two half-pieces 36a are interlocked together. The cantilever arms 41 and the notches 45 of one half-piece 36a are provided on opposite sides with respect to the arms 41 and notches 45, respectively, of the other half-piece 36a. As such, when the two half-pieces 36a are brought together for a snap-fit interlock, the cantilever arms 41 of one half-piece 36a align with the notches 45 of the opposing half-piece 36a and vice versa.

The molding process used to manufacture the proximal housing portion 36' allows the interior of the proximal housing portion 36' to be provided with a continuous curve 150 that extends along the length of the take-up region of connector 20'. The insertion caps 40A' and 40B' are similar to the insertion caps 40A, 40B except the parts are molded plastic parts with the inner diameter transitions at the proximal and distal ends of the caps have a more curved profile.

Figure 27:
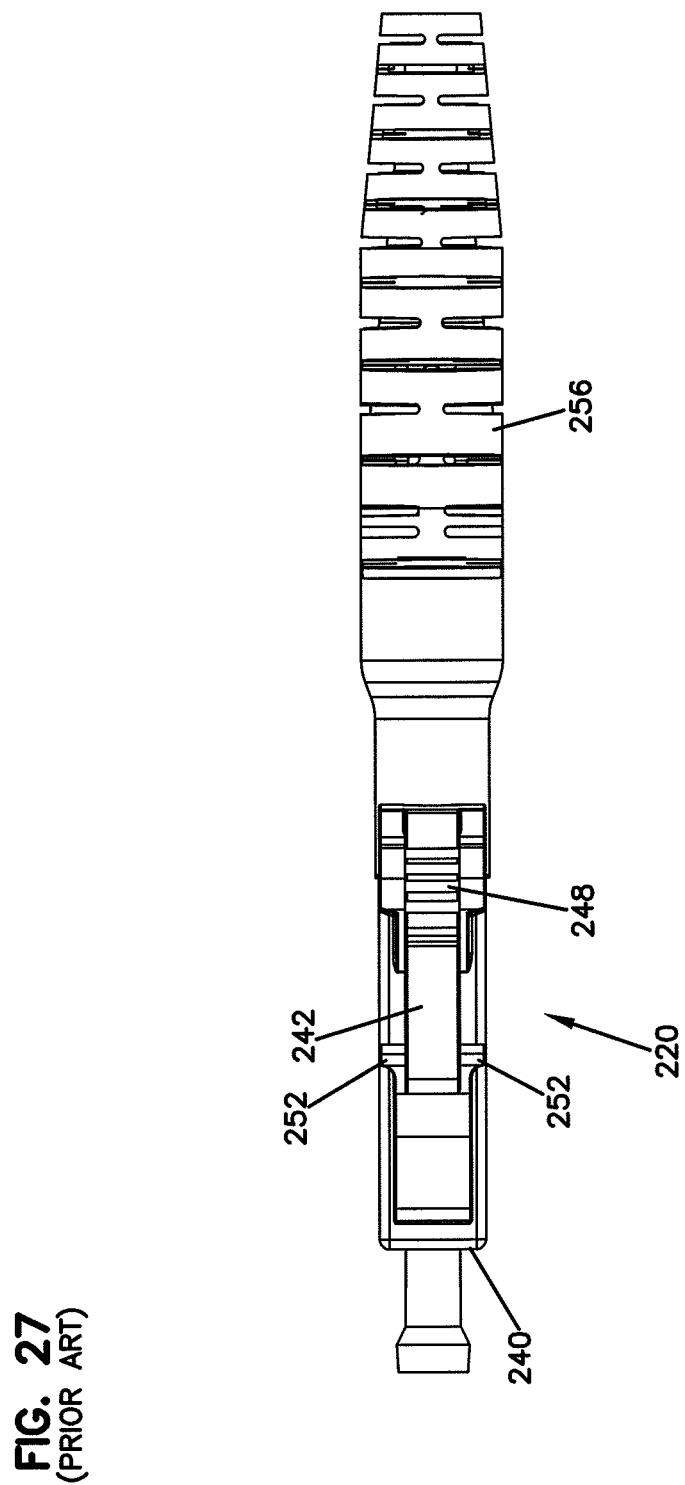
FIG. 27 is a top view of a prior art LC style fiber optic connector.
Figure 28:
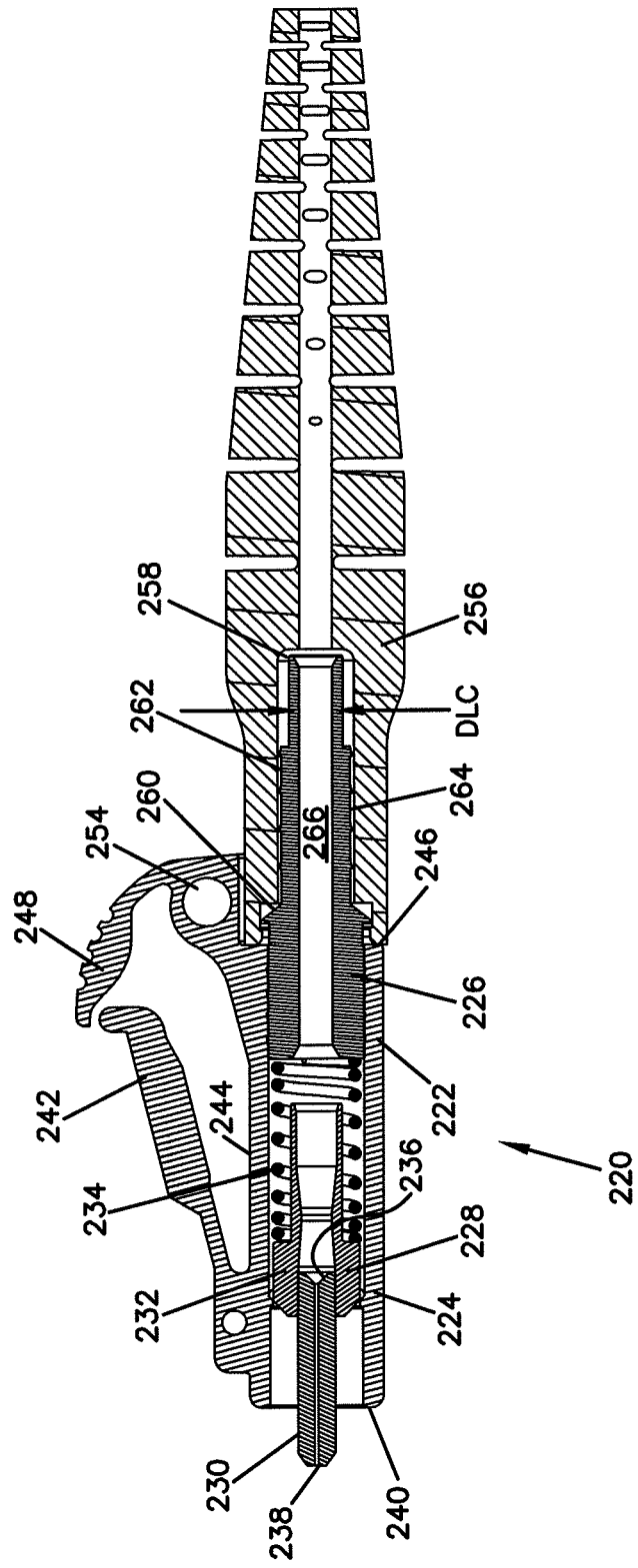
FIG. 28 is a cross-sectional view that longitudinally bisects the fiber optic connector of FIG. 27.
Figure 29:
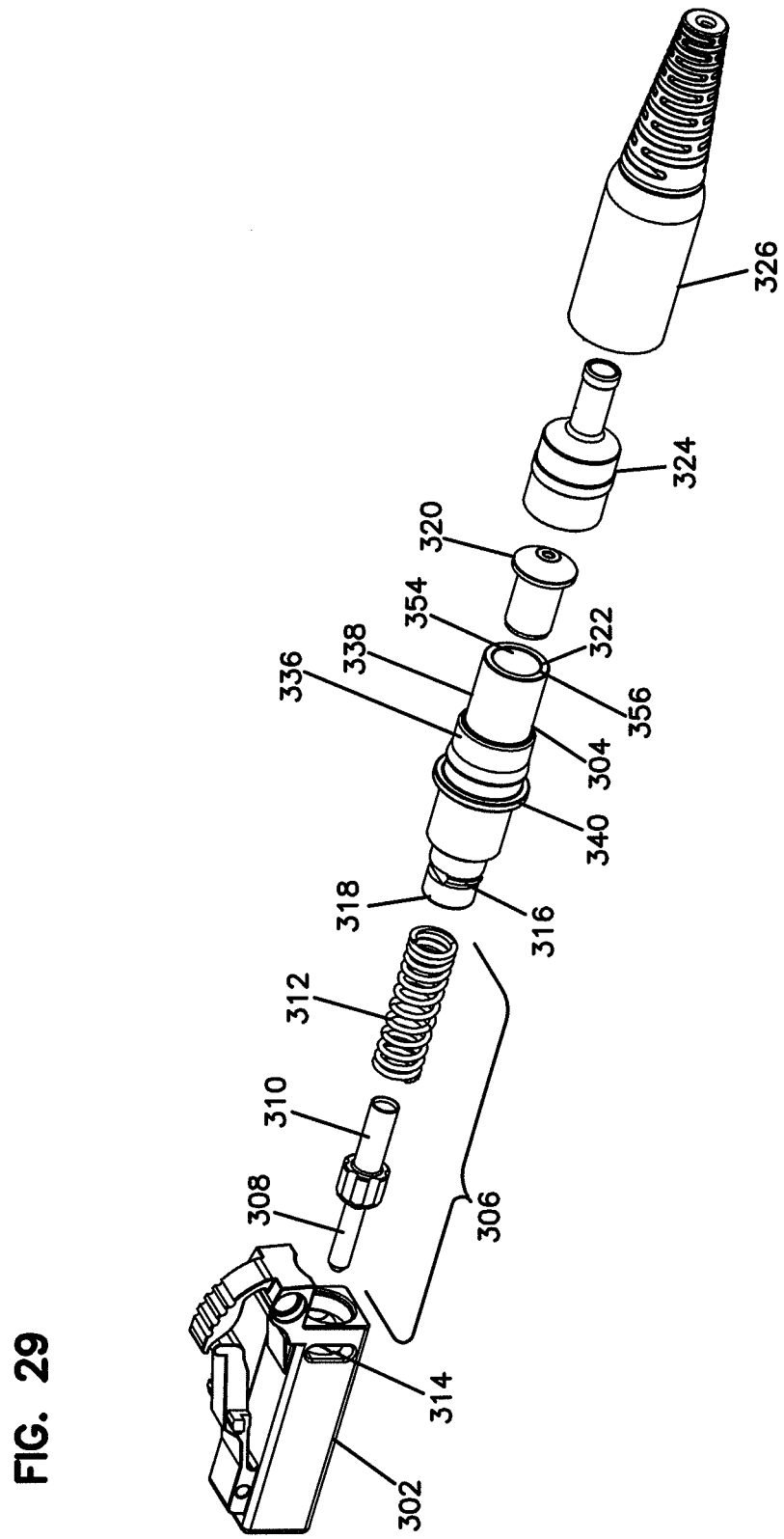
FIG. 29 is a perspective, exploded view of a third fiber optic connector having features with inventive aspects in accordance with the principles of the present disclosure.
Figure 30:
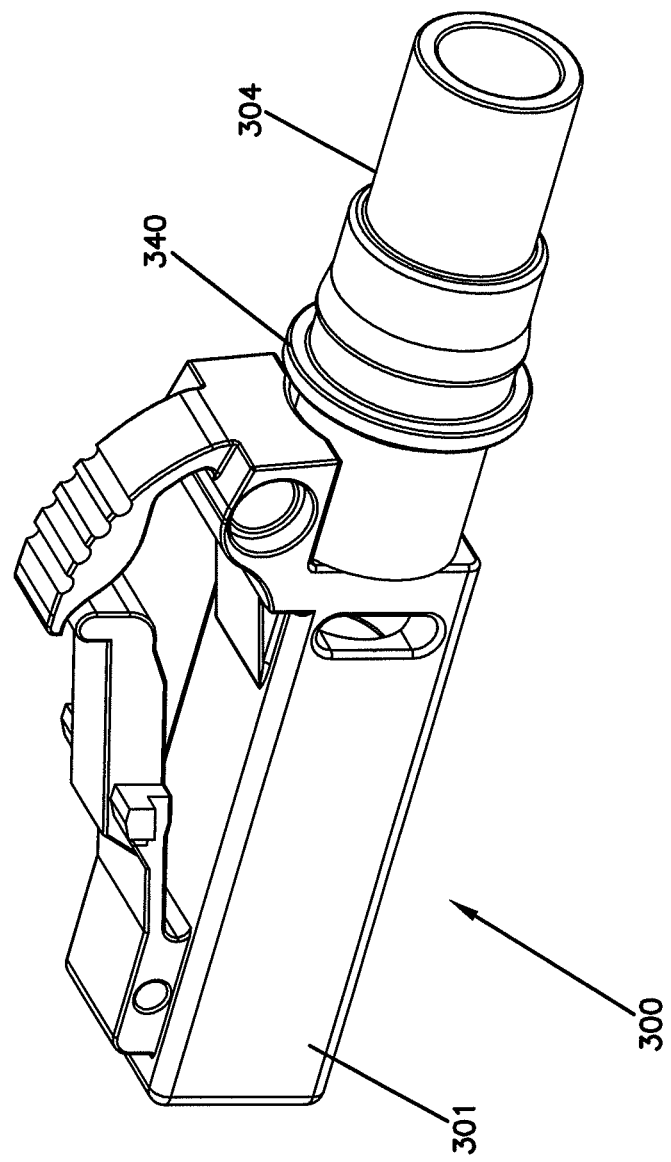
FIG. 30 is a partially assembled perspective view of the fiber optic connector of FIG. 29.
Figure 31:
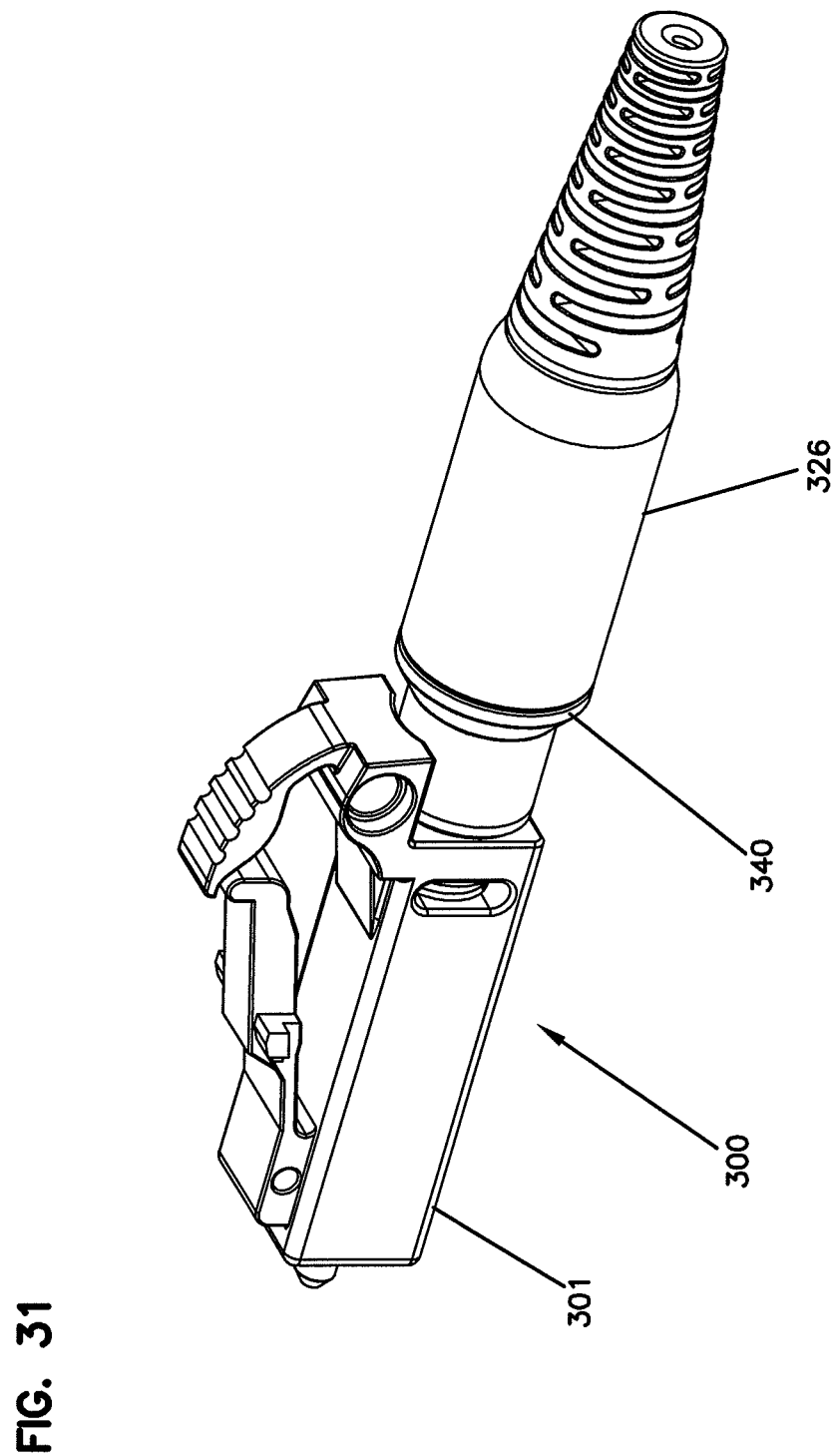
FIG. 31 is a fully assembled perspective view of the fiber optic connector of FIG. 29.
Figure 32:
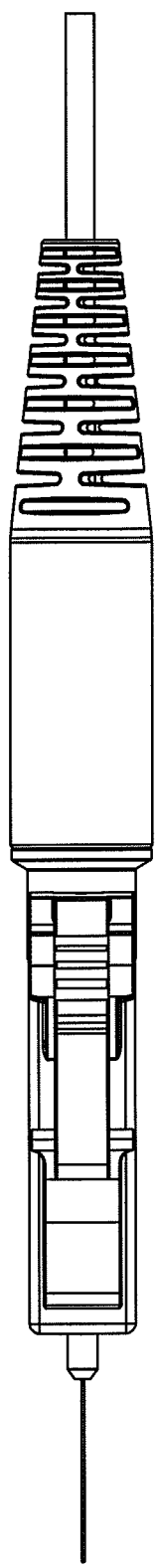
FIG. 32 is a top view of the fiber optic connector of FIG. 29.

FIGS. 27 and 28 illustrate a prior art fiber optic connector 220 in the form of a conventional LC connector. As shown in FIGS. 27 and 28, the conventional LC connector 220 includes a connector housing 222 defining a distal housing portion 224 and a proximal housing portion 226. The LC connector 220 includes a ferrule assembly 228 defined by a ferrule 230, a hub 232, and a spring 234. A proximal end 236 of the ferrule 230 is secured within the ferrule hub 232. When the LC connector 220 is assembled, the ferrule hub 232 and the spring 234 are captured between the distal housing portion 224 and the proximal housing portion 226 of the connector housing 222 and a distal end 238 of the ferrule 230 projects distally outwardly beyond a distal end 240 of the connector housing 222. The spring 234 is configured to bias the ferrule 230 in a distal direction relative to the connector housing 222.

According to certain embodiments, the distal housing portion 224 may be formed from a molded plastic. The distal housing portion 224 defines a latch 242 extending from a top wall 244 of the distal housing portion 224 toward the proximal end 246, the latch 242 extending at an acute angle with respect to the top wall 244 of the distal housing portion 224. The distal housing portion 224 also includes a latch trigger 248 that extends from the proximal end 246 of the distal housing portion 224 toward the distal end 240. The latch trigger 248 also extends at an acute angle with respect to the top wall 244. The latch trigger 248 is configured to come into contact with the latch 242 for flexibly moving the latch 242 downwardly.

As is known in the art, when the fiber optic connector 220 is placed in an LC adapter 250 for optically coupling light from two optical fibers together, the latch 242 functions to lock the fiber optic connector 220 in place within the adapter 250. The fiber optic connector 220 may be removed from the adapter 250 by depressing the latch trigger 248, which causes the latch 242 to be pressed in a downward direction, freeing catch portions 252 of the latch 242 from the fiber optic adapter 250.

The region of the distal housing portion 224 from where the latch trigger 248 extends defines a pin hole 254. The pin hole 254 is configured to receive a pin for forming a duplex LC connector by coupling two simplex connectors 220 in a side-by-side orientation.

Still referring to FIGS. 27 and 28, a strain relief boot 256 is slid over a proximal end 258 of the proximal housing portion 226 and snaps over a boot flange 260 to retain the boot 256 with respect to the connector housing 222. The proximal end 258 of the proximal housing portion 226 defines a crimp region 262 for crimping a fiber optic cable's strength layer to the proximal housing portion 226, normally with the use of a crimp sleeve (not shown). The exterior surface 264 of the proximal housing portion 226 defining the crimp region 262 can be textured (e.g., knurled, ridged, provided with small projections, etc.) to assist in retaining the crimp on the housing 222.

As discussed above with respect to the embodiments of the SC connector shown in FIGS. 1-26, movement of the ferrule 230 of the LC connector in a proximal direction relative to the connector housing 222 causes the optical fiber to be forced/displaced in a proximal direction relative to the connector housing 222 and the jacket of the fiber optic cable. However, in the conventional LC connector 220 shown in FIGS. 27 and 28, the passage 266 defined by the proximal housing portion 226 that extends along the longitudinal axis of the connector 220 defines a generally uniform inner diameter DLC similar in size to the diameter of the portion of the optical fiber that includes the core, the cladding layer and the one or more coating layers. As such, the proximal housing portion 226 of a conventional LC connector 220 does not include a fiber take-up region to prevent signal degradation related to microbending caused by the axial displacement of the optical fiber in the proximal direction.

FIGS. 29-45 illustrate various parts of a third fiber optic connector 300 in accordance with the principles of the present disclosure. The connector 300 includes inventive features similar to those shown and described for the SC type connectors 20, 20' of FIGS. 1-26, however, is provided in an LC connector footprint.

Referring to FIGS. 29-45, the fiber optic connector 300 includes a connector housing 301 including a distal housing portion 302 and a proximal housing portion 304. The distal housing portion 302 is similar in configuration to that of a conventional LC connector and includes a ferrule assembly 306 defined by a ferrule 308, a hub 310, and a spring 312 mounted therein. The ferrule hub 310 and the spring 312 are captured within the distal housing portion 302 by the proximal housing portion 304 of the connector housing 301. The distal housing portion 302 defines slots 314 that are configured to receive ribs 316 formed at a distal end 318 of the proximal housing portion 304 for snap-fitting the two housing portions 302, 304 together.

An insertion cap 320 having features similar to insertion caps 40A and 40A' is inserted into a proximal end 322 of the proximal housing portion 304. As discussed above with respect to the SC style connectors 20, 20', an alternative embodiment of an insertion cap having a larger inner diameter for accommodating a protective tubing can also be used. A crimp sleeve 324 is inserted over the proximal end 322 of the proximal housing portion 304 and captures the insertion cap 320 thereagainst. The crimp sleeve 324 is used to crimp a fiber optic cable in a manner similar to that described above for the SC style connectors 20, 20'.

Figure 33:
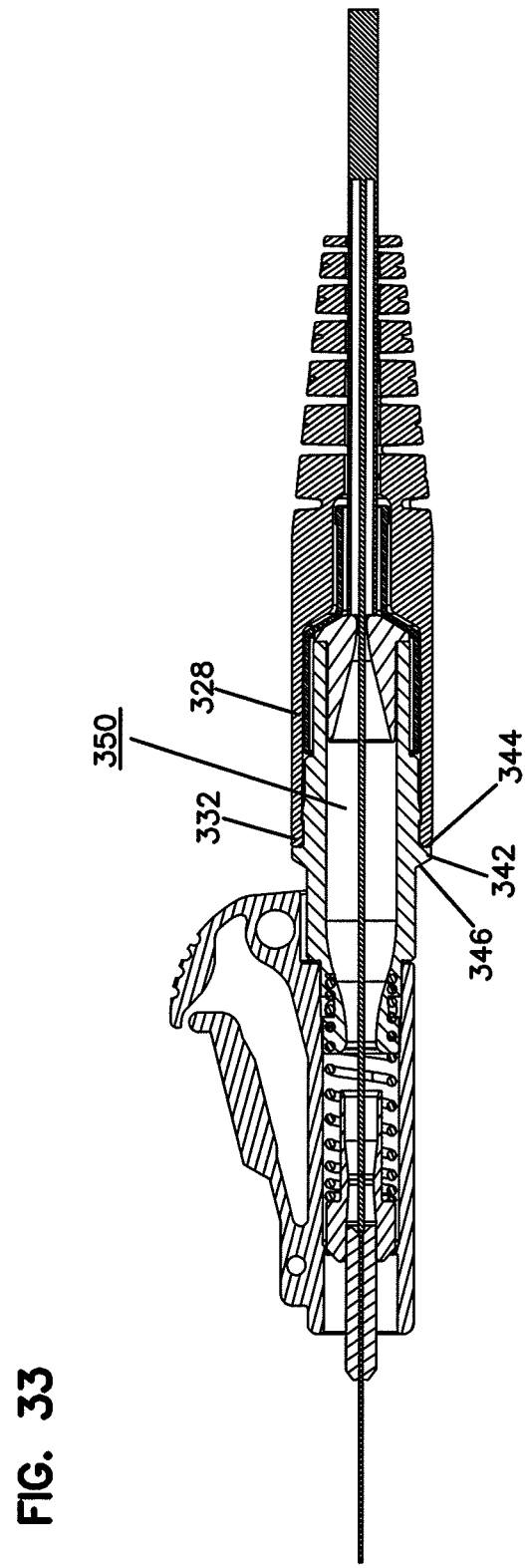
FIG. 33 is a cross-sectional view that longitudinally bisects the fiber optic connector of FIG. 29.

A strain relief boot 326 is mounted over the proximal end 322 of the proximal housing portion 304. The strain relief boot 326 includes a connection portion 328 defining a generally circular inner passage 330 (see FIGS. 44 and 45). An annular inner lip 332 defined at a distal end 334 of the strain relief boot 326 mounts over a generally round boot flange 336 defined on the outer surface 338 of the proximal housing portion 304. When the strain relief boot 326 is mounted over the proximal housing portion 304, the distal end 334 of the strain relief boot 326 abuts against a stop ring 340. As shown in FIG. 33, the stop ring 340 defines a conical configuration 342 along the longitudinal direction of the connector 300, the ring 340 tapering down as it extends from a proximal end 344 toward a distal end 346.

Figure 34:
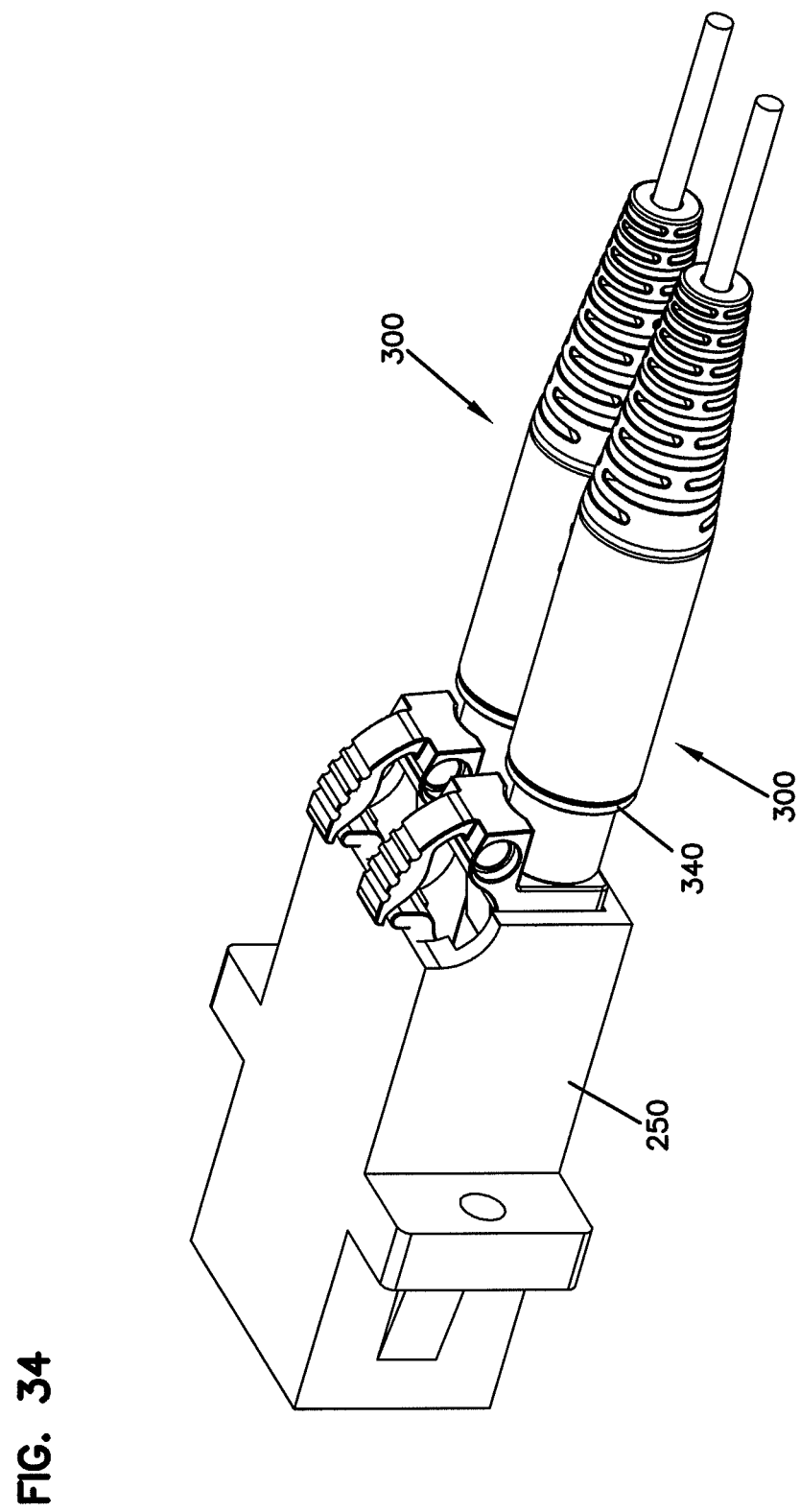
FIG. 34 illustrates a perspective view of two of the fiber optic connectors of FIG. 29 coupled to a duplex LC fiber optic adapter.
Figure 35:
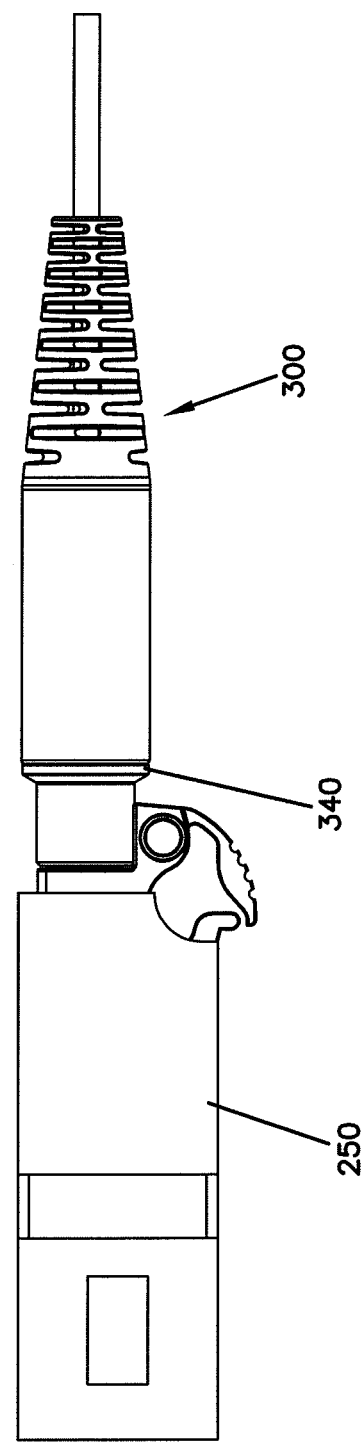
FIG. 35 is a side view of the fiber optic connectors coupled to a duplex LC fiber optic adapter of FIG. 34.
Figure 36:
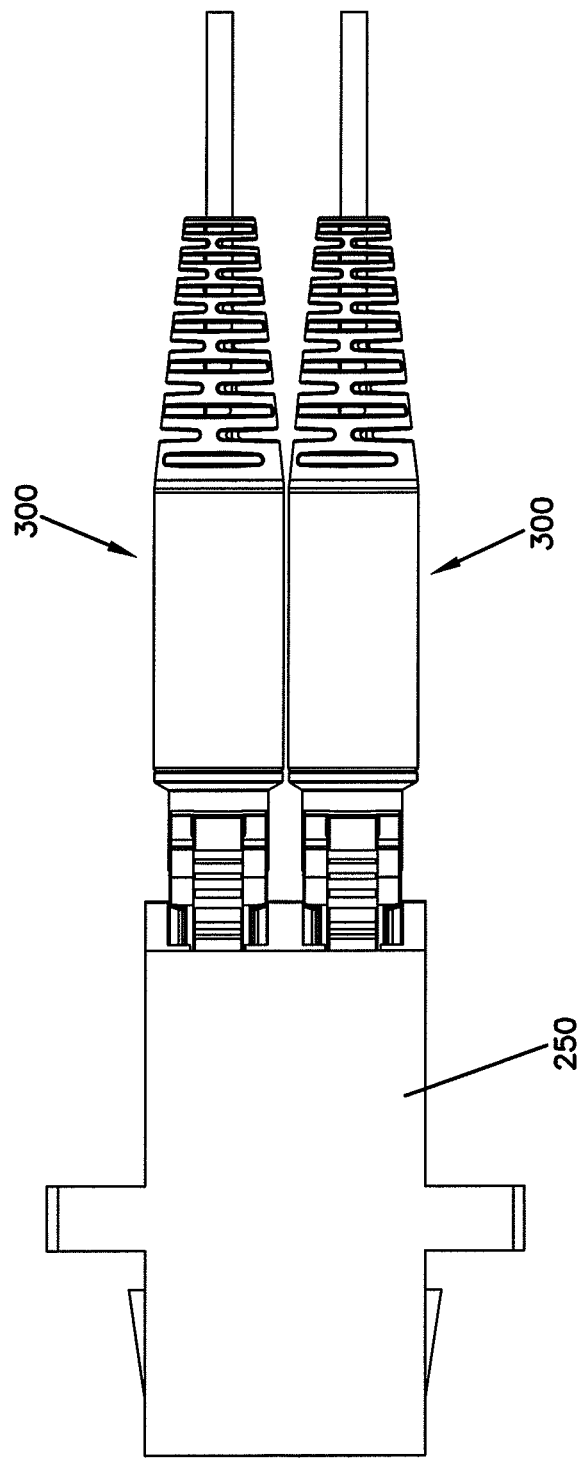
FIG. 36 is a top view of the fiber optic connectors coupled to a duplex LC fiber optic adapter of FIG. 34.
Figure 39:
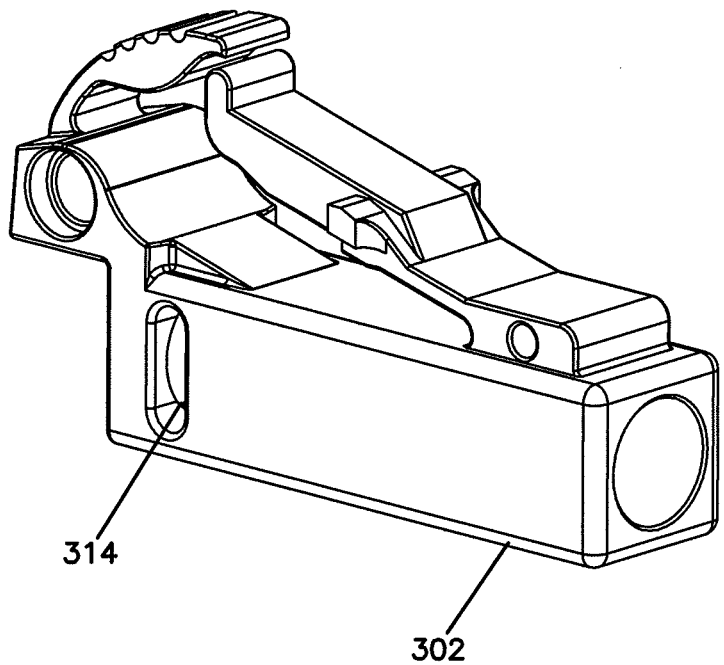
FIG. 39 is a perspective view of a front housing of the fiber optic connector of FIG. 29.
Figure 40:
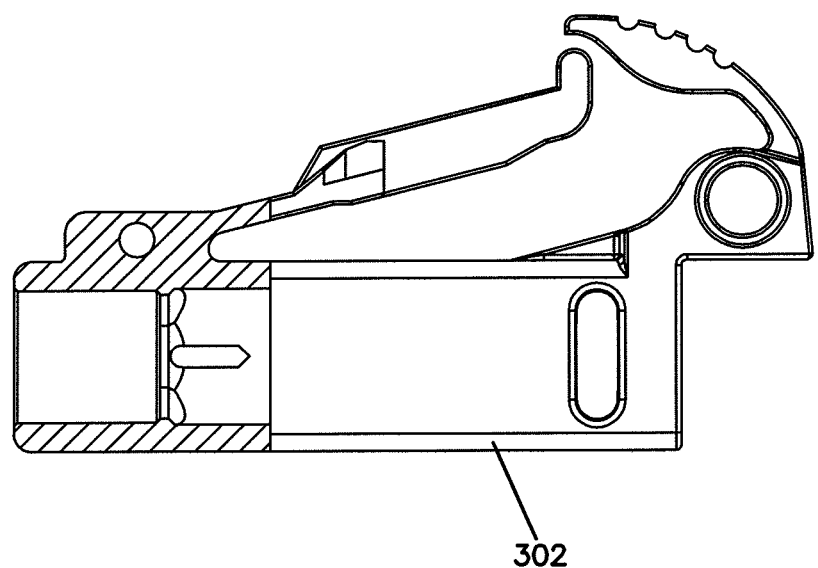
FIG. 40 is a side view of the front housing of the fiber optic connector of FIG. 39, with a portion of the front housing broken-away to illustrate the internal configuration thereof.
Figure 41:
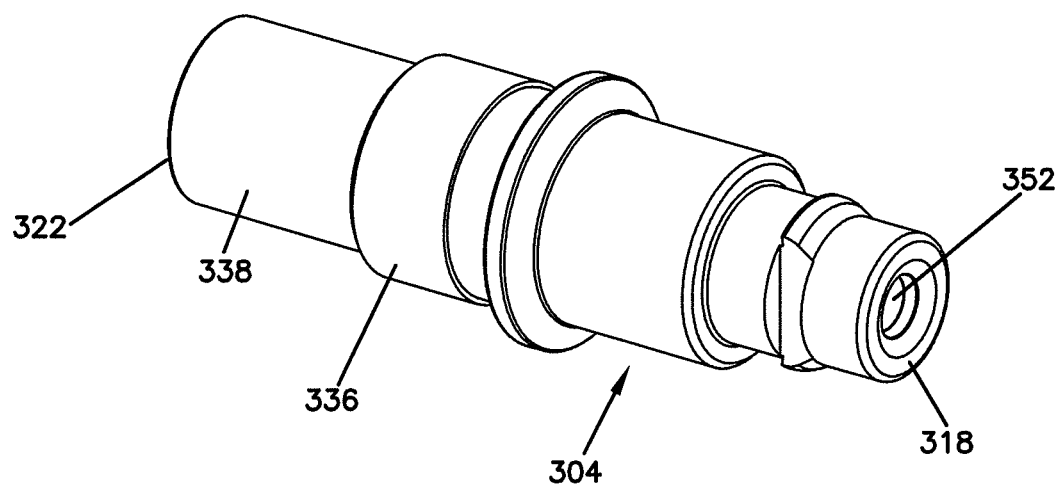
FIG. 41 is a perspective view of a rear housing of the fiber optic connector of FIG. 29.
Figure 42:
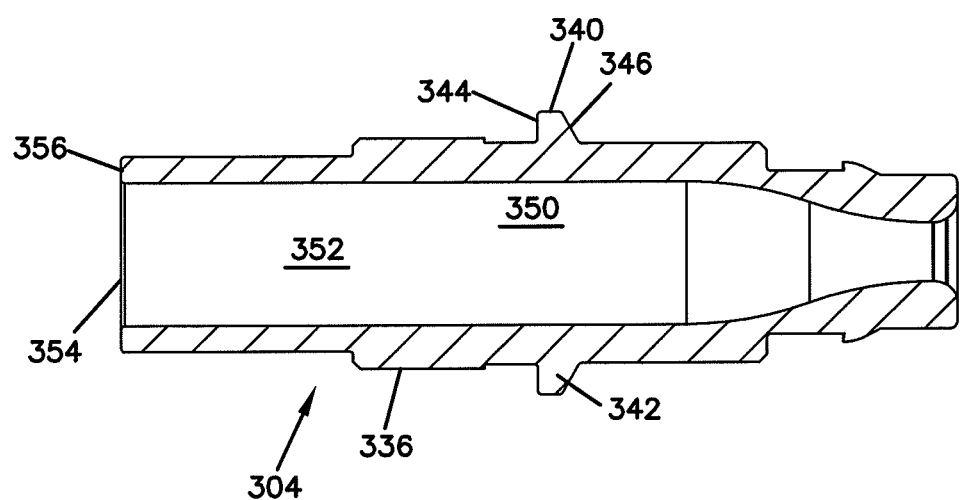
FIG. 42 is a cross-sectional view that longitudinally bisects the rear housing of FIG. 41.
Figure 43:
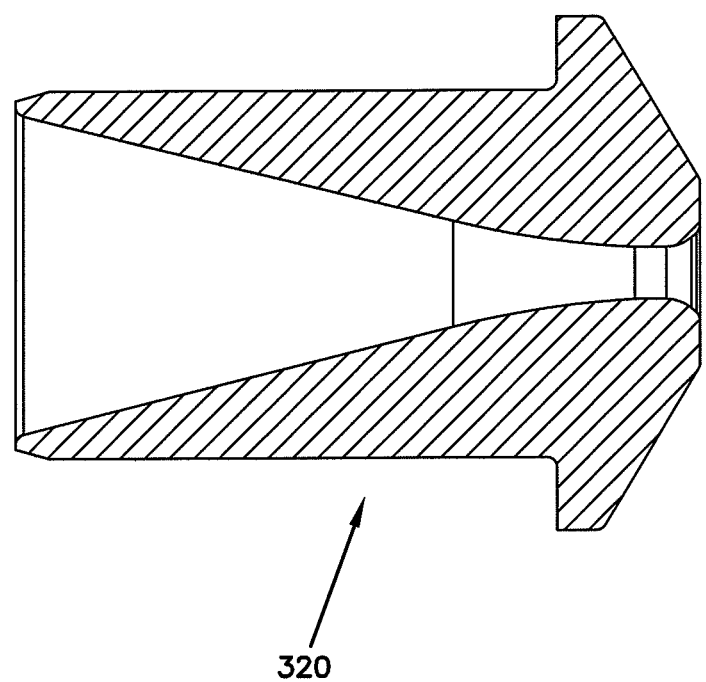
FIG. 43 is a cross-sectional view that longitudinally bisects the insertion cap of the fiber optic connector shown in FIG. 29.
Figure 44:
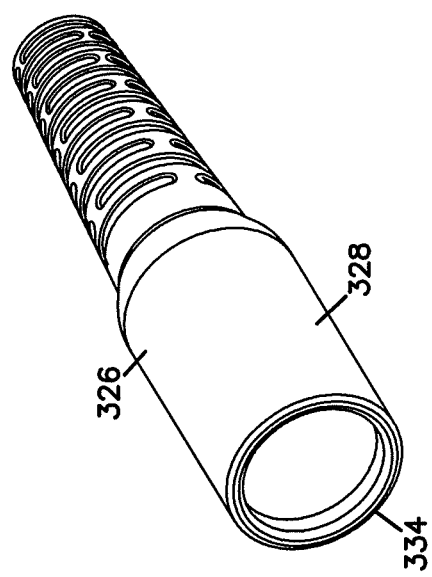
FIG. 44 is a perspective view of a strain relief boot of the fiber optic connector of FIG. 29.
Figure 45:
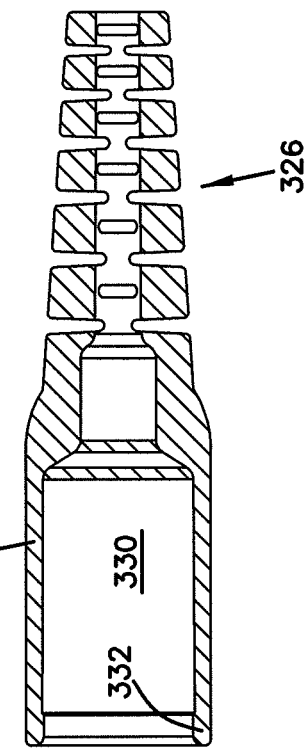
FIG. 45 is a cross-sectional view that longitudinally bisects the strain relief boot of FIG. 41.
Figure 46:
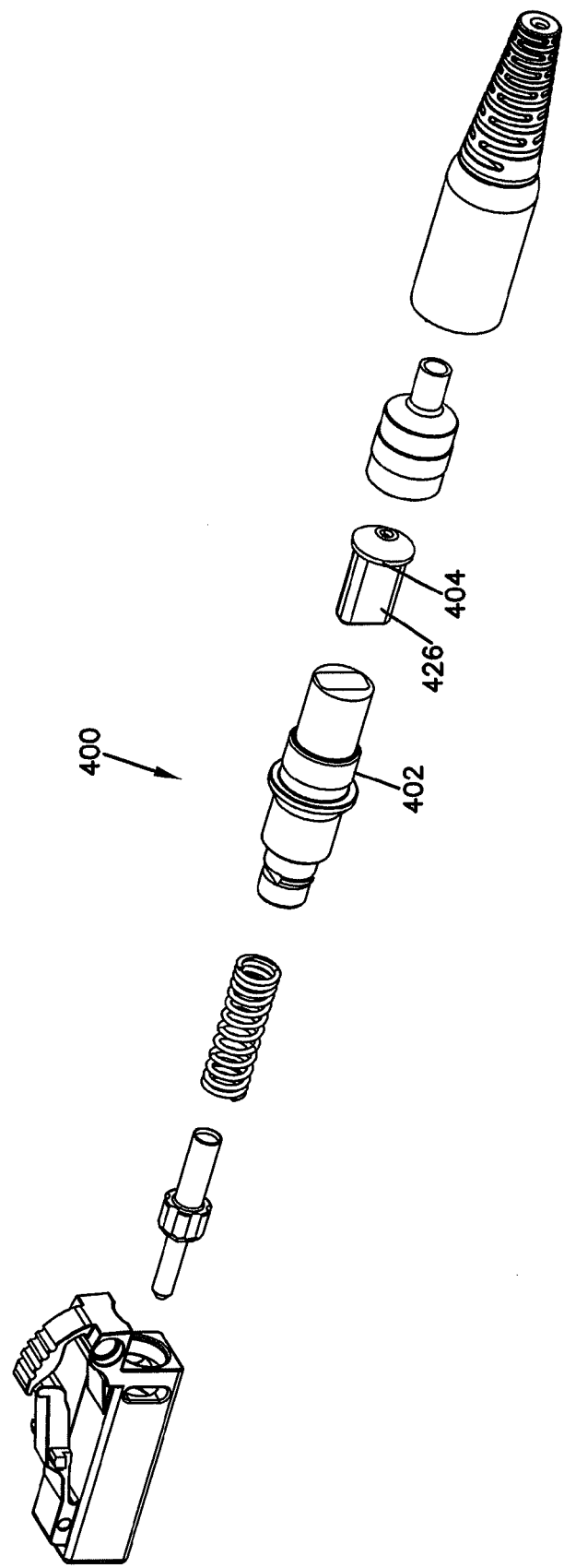
FIG. 46 is a perspective, exploded view of a fourth fiber optic connector having features with inventive aspects in accordance with the principles of the present disclosure.
Figure 47:
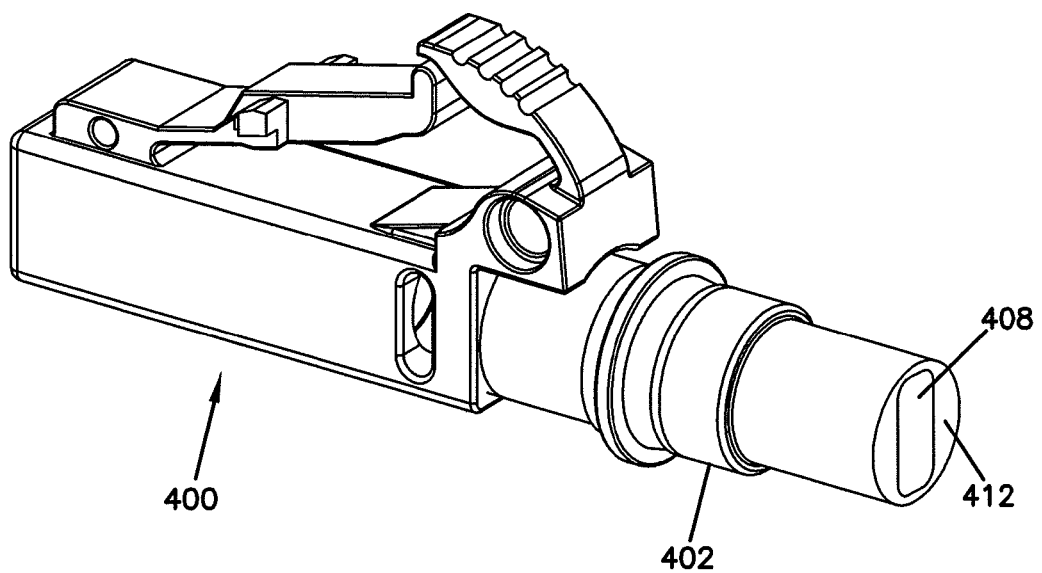
FIG. 47 is a partially assembled perspective view of the fiber optic connector of FIG. 46.
Figure 48:
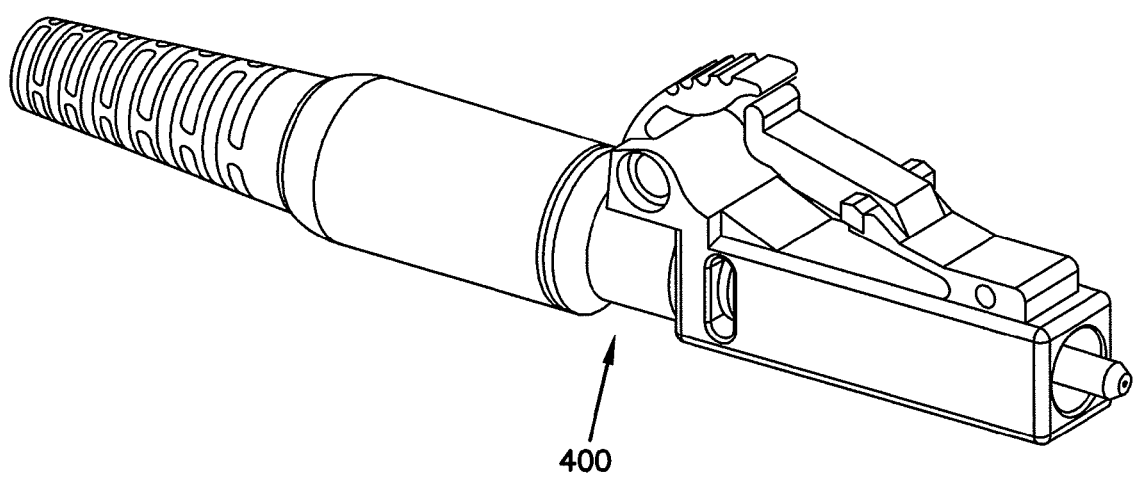
FIG. 48 is a fully assembled perspective view of the fiber optic connector of FIG. 46.
Figure 49:
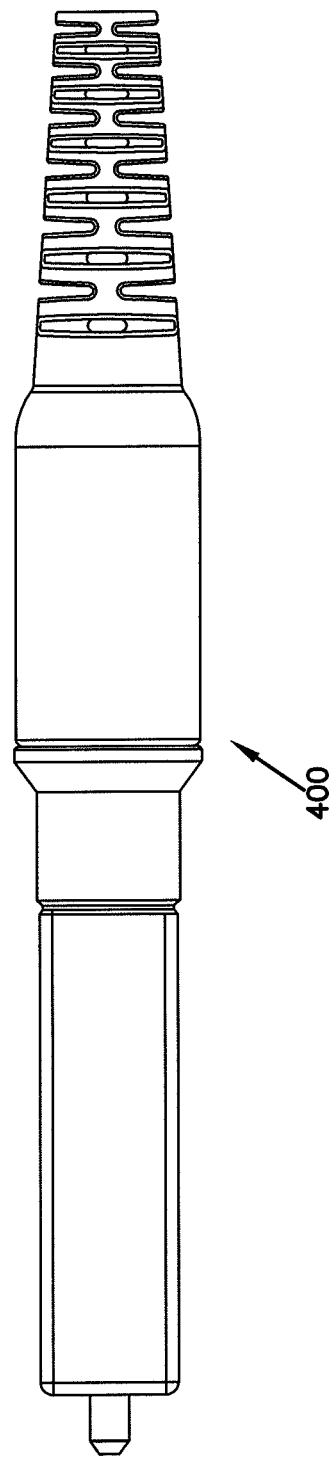
FIG. 49 is a top view of the fiber optic connector of FIG. 46.
Figure 50:
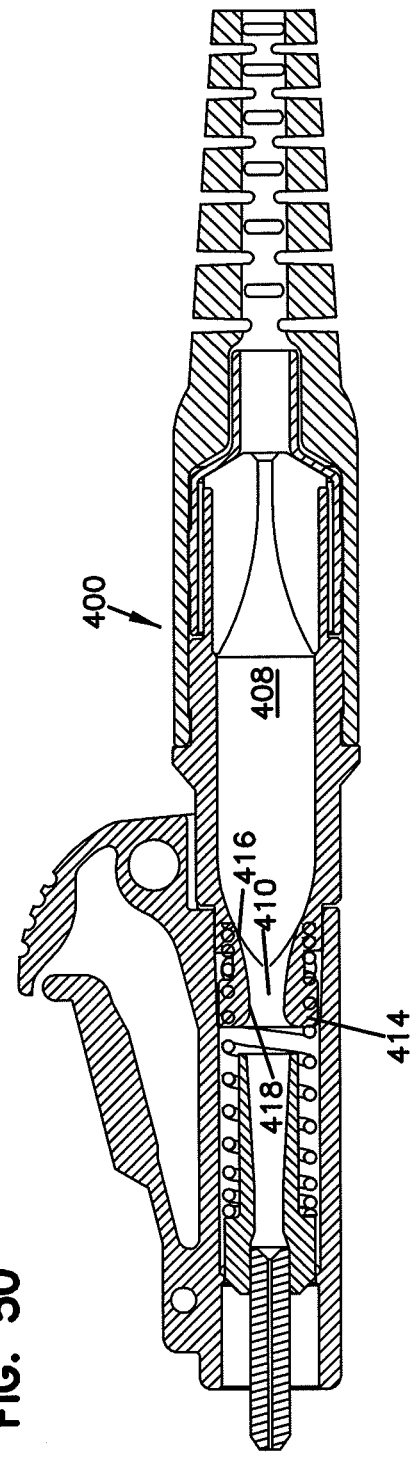
FIG. 50 is a cross-sectional view that longitudinally bisects the fiber optic connector of FIG. 46.
Figure 51:
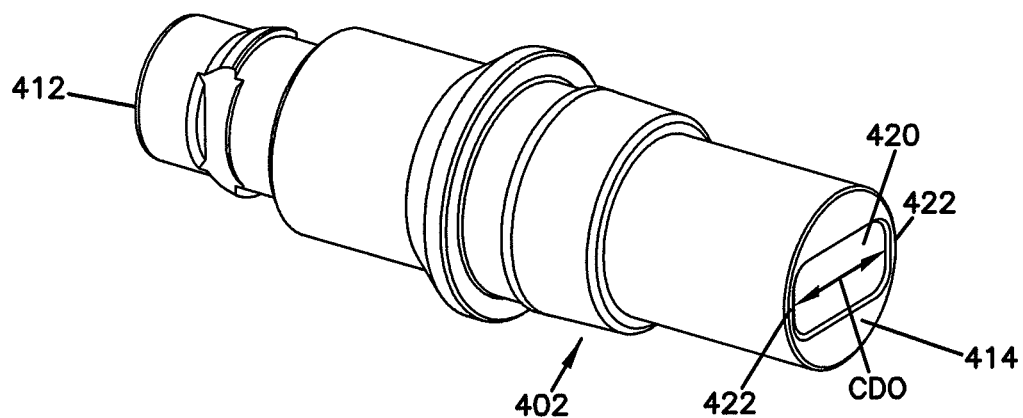
FIG. 51 is a perspective view of a rear housing of the fiber optic connector of FIG. 46.

When the fiber optic connector 300 is fully assembled, the connector 300 retains the overall outer dimension of a conventional LC connector such that two fiber optic connectors 300 can be mounted side by side in a standard duplex configuration. FIGS. 37 and 38 illustrate two of the fiber optic connectors 300 mounted together using a duplex clip 348. FIGS. 34-36 illustrate two of the fiber optic connectors 300 mounted in a standard duplex LC adapter 250 in a side by side configuration.

As noted above, as shown in FIGS. 33, 42, and 43, the proximal housing portion 304 and the insertion cap 320 of the connector 300 are configured to provide a fiber take-up spacing 350 for allowing macrobending of the optical fiber within the connector housing 301, in a similar fashion to that described above for the SC style connectors 20, 20'. For the connector 300, the proximal housing portion 304 and the insertion cap 320 are depicted as machined metal parts.

FIGS. 46-59 illustrate various parts of a fourth embodiment of a fiber optic connector 400 in accordance with the principles of the present disclosure. The connector 400 has been modified with respect to the connector 300 so as to include a proximal housing portion 402 and an insertion cap 404 which are made of molded plastic. In addition, unlike the proximal housing portion 304 of the connector 300 described above, which has a fiber take-up region 350 defined by a circular passage 352 extending from the proximal end 322 of the proximal housing portion 304 to the distal end 318 thereof, the proximal housing portion 402 of the connector housing 406 defines an obround passage 408 that transitions to a generally circular passage 410 as it extends from a proximal end 412 of the proximal housing portion 402 to the distal end 414 thereof. As shown in FIG. 54, the passage defines an obround configuration 408 from the proximal end 412 until it reaches the transition portion 416 coming before the neck portion 418. The obround portion 408 of the passage is provided to increase the predictability of the bending of the fiber as the fiber is exposed to axial displacement within the connector 400 and control the direction of the bend.

Figure 52:
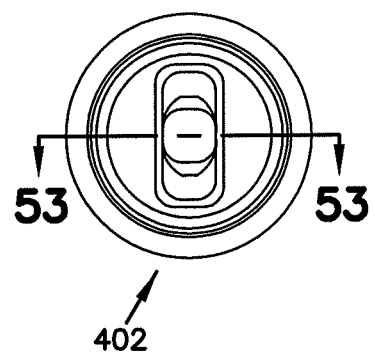
FIG. 52 is a front view of the rear housing of FIG. 51.
Figure 55:
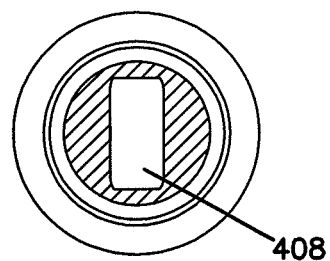
FIG. 55 is a cross-sectional view taken along line 55-55 of FIG. 54.
Figure 53:
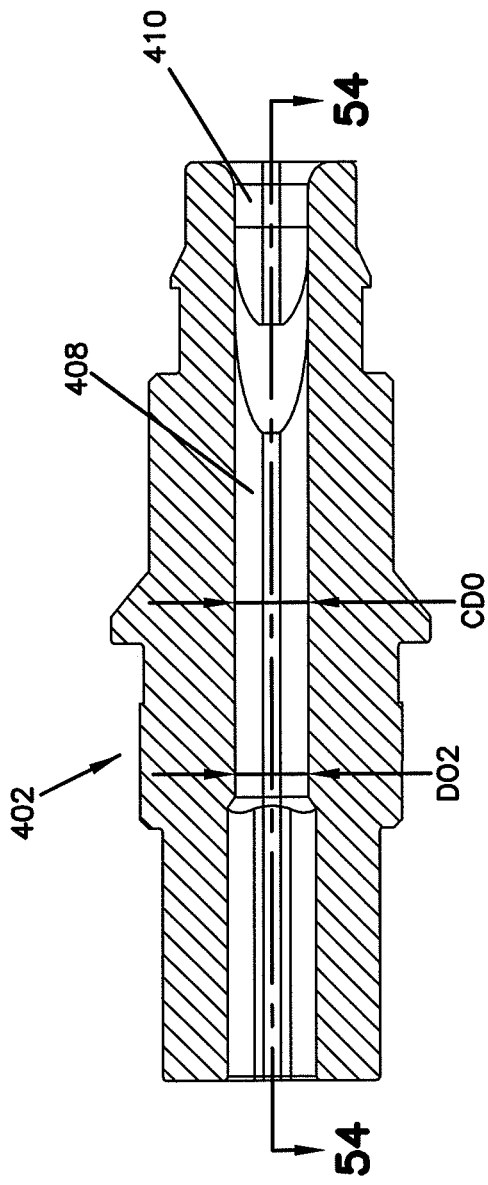
FIG. 53 is a cross-sectional view taken along line 53-53 of FIG. 52.
Figure 54:
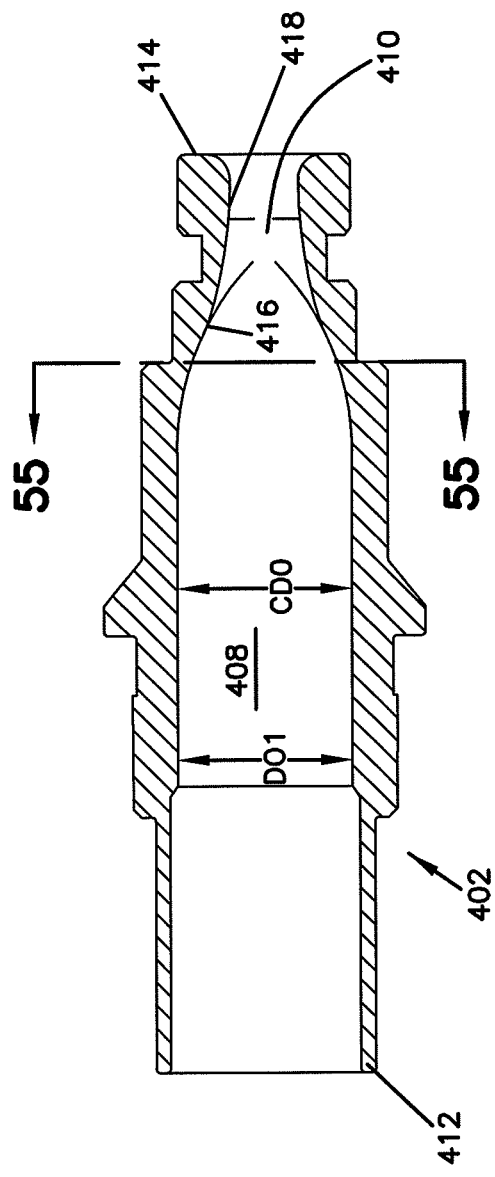
FIG. 54 is a cross-sectional view taken along line 54-54 of FIG. 53.
Figure 56:
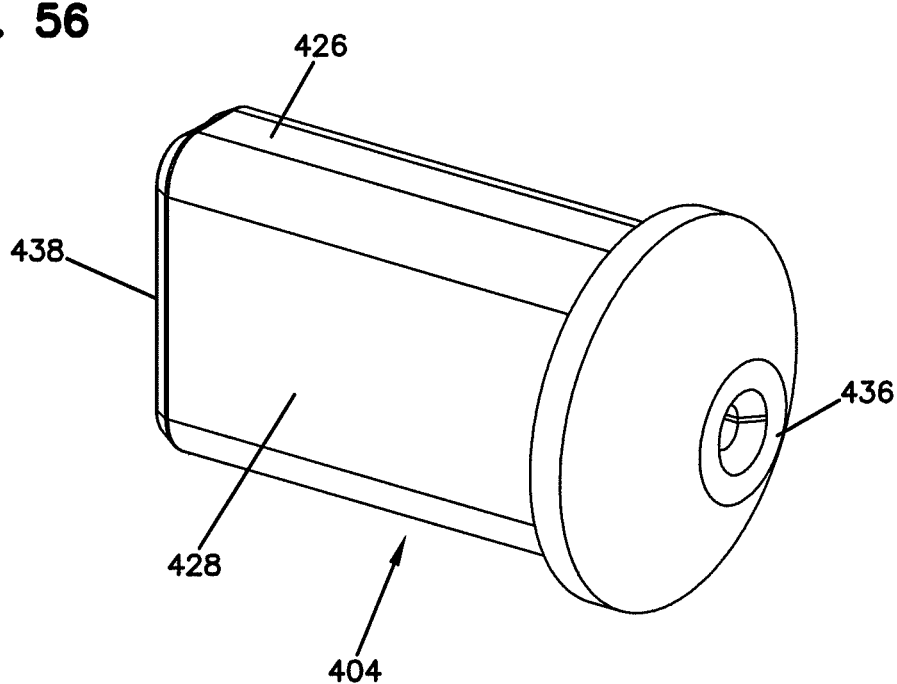
FIG. 56 is a perspective view of an insertion cap that can be used with the fiber optic connector of FIG. 46.
Figure 57:
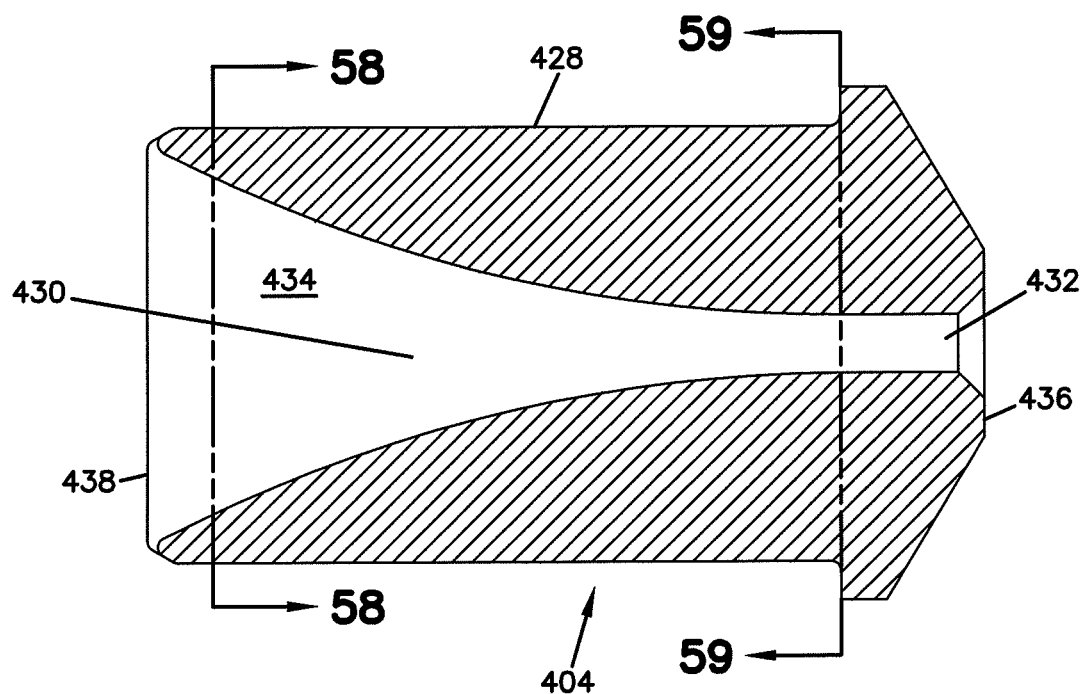
FIG. 57 is cross-sectional view that bisects the insertion cap of FIG. 56.
Figure 58:
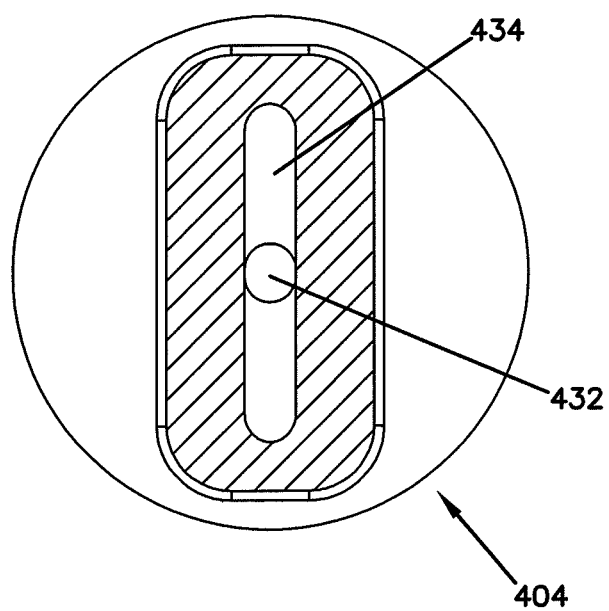
FIG. 58 is a cross-sectional view taken along line 58-58 of FIG. 57.
Figure 59:
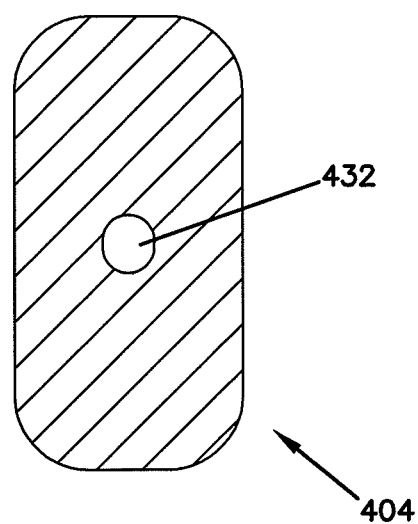
FIG. 59 is a cross-sectional view taken along line 59-59 of FIG. 57.

As shown in the cross-sectional views provided in FIGS. 52 and 53, the obround portion 408 of the passage defines a larger cross-dimension CDO along a first direction DO1 (taken along lines 55-55 of FIG. 54) than a second direction DO2 (taken along lines 53-53 of FIG. 52). In addition, by providing an obround internal passage 408, the size of the opening 420 at the proximal end 412 of the proximal housing portion 402 is increased relative to the annular circular opening 354 of the connector 300 shown in FIGS. 29-45 when that opening 420 is measured along the longer cross dimension CDO of the obround passage 408. By providing an obround passage 408, the sidewall 422 defined along the longer cross dimension CDO of the obround passage 408 is able to be decreased relative to a uniform sidewall 356 that is provided about the circular opening 354 of the connector 300.

The insertion cap 404 of the connector 400 defines a stub portion 426 having an exterior obround configuration 428 to match that of the proximal end 412 of the proximal housing portion 402. As shown in FIGS. 56-59, the insertion cap 404 also defines an internal passage 430 that transitions from a generally circular opening 432 to an obround configuration 434 as the passage 430 extends from the proximal end 436 to the distal end 438 of the insertion cap 404. The obround portion 434 of the passage 430 cooperates with the obround portion 408 of the internal passage of the proximal housing portion 402 in controlling the direction of the fiber bend.

Although in the foregoing description, terms such as "top", "bottom", "front", "back", "rear", "right", "left", "upper", and "lower may have been used for ease of description and illustration, no restriction is intended by such use of the terms. The connectors described herein can be used in any orientation, depending upon the desired application.

The above specification, examples and data provide a description of the inventive aspects of the disclosure. Many embodiments of the disclosure can be made without departing from the spirit and scope of the inventive aspects of the disclosure.

The invention claimed is:

1. A fiber optic connector and cable assembly comprising:
a fiber optic connector including a connector housing having a distal housing portion that connects to a proximal housing portion, the distal housing portion defining a distal end of the connector housing and the proximal end portion defining a proximal end of the connector housing;
the fiber optic connector including a ferrule assembly having a ferrule, a ferrule hub and a ferrule spring, the ferrule having a distal end face that is accessible at the distal end of the connector housing, the ferrule hub and the ferrule spring being captured between the distal housing portion and the proximal housing portion, the ferrule spring biasing the ferrule in a distal direction relative to the connector housing, the ferrule being movable in a proximal direction relative to the connector housing from a distal position to a proximal position, the distal and proximal positions being separated by an axial displacement distance, the proximal movement of the ferrule being against the bias of the ferrule spring;
a fiber optic cable including an optical fiber contained within a cable jacket, the fiber optic cable also including a strength layer positioned between the optical fiber and the cable jacket, the strength layer being anchored to the connector housing, the optical fiber extending through a fiber passage of the fiber optic connector from the proximal end of the connector housing to the ferrule, the optical fiber having a distal portion potted within the ferrule; and
the fiber passage of the fiber optic connector having a fiber take-up region through which the optical fiber extends, the fiber take-up region being configured to take-up an excess length of the optical fiber that corresponds to the axial displacement distance of the ferrule, the fiber take-up region having an intermediate section positioned between a distal section and a proximal section, the intermediate section defining an intermediate transverse cross-sectional area, the distal section defining a distal transverse cross-sectional area, the proximal section defining a proximal transverse cross-sectional area, the distal transverse cross-sectional area and the proximal transverse cross-sectional area each being smaller than the intermediate transverse cross-sectional area, and the fiber passage defining a first transition portion between the distal section and the intermediate section and a second transition portion between the proximal section and the intermediate section, each of the first and second transition portions defining a gradual increase in transverse cross-sectional area as the distal and proximal sections transition to the intermediate section so as to form funnel shaped passages at the first and second transition portions, the distal transverse cross-sectional area being defined at a location that is proximally offset from the ferrule.

2. The fiber optic connector and cable assembly of claim 1, wherein the distal transverse cross-sectional area is defined at a location that is proximally offset from a proximal end of the ferrule spring.

3. The fiber optic connector and cable assembly of claim 1, wherein the axial displacement distance is at least 0.015 inches.

4. The fiber optic connector and cable assembly of claim 1, wherein the axial displacement distance is at least 0.025 inches.

5. The fiber optic connector and cable assembly of claim 1, wherein the axial displacement distance is at least 0.035 inches.

6. The fiber optic connector and cable assembly of claim 1, wherein the fiber optic connector is an SC style connector that includes a release sleeve that slidably mounts over the connector housing.

7. The fiber optic connector and cable assembly of claim 1, wherein the fiber optic connector is an LC style connector that includes a flexible latch extending at an acute angle from a top wall of the distal housing portion toward the proximal end of the connector housing.

8. The fiber optic connector and cable assembly of claim 1, wherein the fiber optic connector further comprises a strain relief boot coupled adjacent the proximal end of the connector housing, the strain relief boot configured to provide strain relief and bend radius protection to the optical fiber.

9. The fiber optic connector and cable assembly of claim 1, wherein at least a portion of an outer profile of the strain relief boot defines a circular configuration.

10. The fiber optic connector and cable assembly of claim 1, wherein at least a portion of an outer profile of the strain relief boot defines a generally square configuration.

11. The fiber optic connector and cable assembly of claim 1, wherein the proximal transverse cross-sectional area is defined within an interior of an insertion cap of the fiber optic connector.

12. The fiber optic connector and cable assembly of claim 1, wherein the intermediate section has a cross-dimension that is at least two times as large as a cross-dimension of the distal section.

13. The fiber optic connector and cable assembly of claim 1, wherein the intermediate section has a cross-dimension that is at least two times as large as a cross-dimension of the distal section.

14. The fiber optic connector and cable assembly of claim 1, wherein at least a portion of the fiber take-up region defines a first cross dimension that is larger than a second cross dimension that is perpendicular to the first cross dimension, the shape of the fiber take-up region being configured to direct bending of the optical fiber generally along the first cross dimension.

15. The fiber optic connector and cable assembly of claim 14, wherein at least a portion of the fiber take-up region defines an obround configuration.

16. The fiber optic connector and cable assembly of claim 1, wherein the cable jacket has an outer diameter less than 1.5 millimeters.

17. A fiber optic connector and cable assembly comprising:
a fiber optic connector including a connector housing having a distal housing portion that connects to a proximal housing portion, the distal housing portion defining a distal end of the connector housing and the proximal housing portion defining a proximal end of the connector housing;
the fiber optic connector including a ferrule assembly having a ferrule, a ferrule hub and a ferrule spring, the ferrule having a distal end face that is accessible at the distal end of the connector housing, the ferrule hub and the ferrule spring being captured between the distal housing portion and the proximal housing portion, the ferrule spring biasing the ferrule in a distal direction relative to the connector housing, the ferrule being movable in a proximal direction relative to the connector housing from a distal position to a proximal position, the distal and proximal positions being separated by an axial displacement distance, the proximal movement of the ferrule being against the bias of the ferrule spring;
a fiber optic cable including an optical fiber contained within a cable jacket, the fiber optic cable also including a strength layer positioned between the optical fiber and the cable jacket, the strength layer being anchored to the connector housing adjacent the proximal end of the connector housing, the optical fiber extending through a fiber passage of the fiber optic connector from the proximal end of the connector housing to the ferrule, the optical fiber having a distal portion potted within the ferrule; and
the fiber passage of the fiber optic connector having a fiber take-up region through which the optical fiber extends, the fiber take-up region being configured to take-up an excess length of the optical fiber that corresponds to the axial displacement distance of the ferrule, wherein at least a portion of the fiber take-up region defines a first cross dimension that is larger than a second cross dimension that is perpendicular to the first cross dimension, the shape of the fiber take-up region configured to direct bending of the optical fiber generally along the first cross dimension.

18. A fiber optic connector and cable assembly according to claim 17, wherein at least a portion of the fiber take-up region defines an obround configuration.

19. A fiber optic connector and cable assembly according to claim 18, wherein the fiber passage transitions from an obround configuration to a circular configuration as the fiber passage extends from the proximal end of the connector housing to a distal end of the proximal housing portion.

20. The fiber optic connector and cable assembly of claim 17, wherein the fiber optic connector is an LC style connector that includes a flexible latch extending at an acute angle from a top wall of the distal housing portion toward the proximal end of the connector housing.

21. The fiber optic connector and cable assembly of claim 17, wherein the cable jacket has an outer diameter less than 1.5 millimeters.

* * * * *